APPARATUS FOR RECORDING AND REPRODUCING VARIABLES
Filed Sept. 15, 1950 9 Sheets-Sheet 1
Fig. 1.
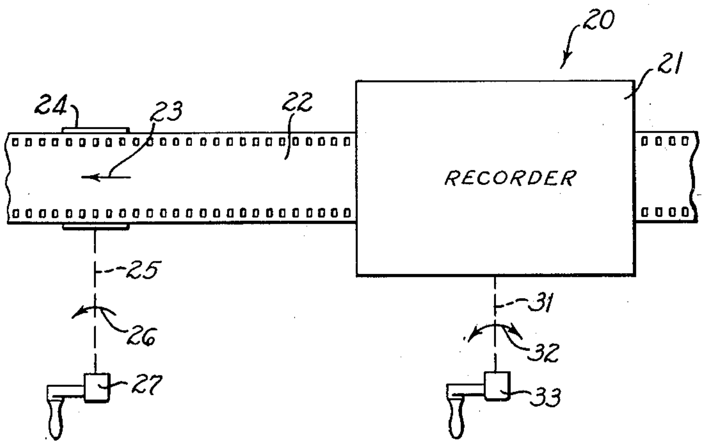
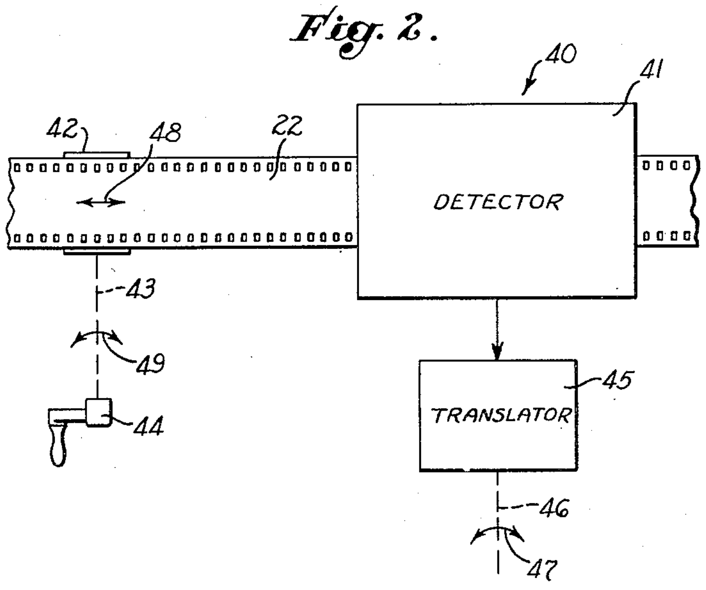
INVENTORS.
MICHAEL E. STICKNEY
ROYAL GLEN MADSEN
LAWRENCE R. PUGH
BY THEIR ATTORNEYS.
HARRIS, KIECH, FOSTER & HARRIS
BY Clarence F. Kiech

APPARATUS FOR RECORDING AND REPRODUCING VARIABLES

Filed Sept. 15, 1950 9 Sheets-Sheet 2

INVENTORS.
MICHAEL E. STICKNEY
ROYAL GLEN MADSEN
LAWRENCE R. PUGH
BY THEIR ATTORNEYS.
HARRIS, KIECH, FOSTER & HARRIS
BY

APPARATUS FOR RECORDING AND REPRODUCING VARIABLES

Filed Sept. 15, 1950 9 Sheets-Sheet 3

INVENTORS.
MICHAEL E. STICKNEY
ROYAL GLEN MADSEN
LAWRENCE R. PUGH
BY THEIR ATTORNEYS.
HARRIS, KIECH, FOSTER & HARRIS
BY

APPARATUS FOR RECORDING AND REPRODUCING VARIABLES

Filed Sept. 15, 1950 9 Sheets-Sheet 4

INVENTORS.
MICHAEL E. STICKNEY
ROYAL GLEN MADSEN
LAWRENCE R. PUGH
BY THEIR ATTORNEYS.
HARRIS, KIECH, FOSTER & HARRIS
BY [signature]

INVENTORS.
MICHAEL E. STICKNEY
ROYAL GLEN MADSEN
LAWRENCE R. PUGH
BY THEIR ATTORNEYS.
HARRIS, KIECH, FOSTER & HARRIS
BY [signature]

INVENTORS.
MICHAEL E. STICKNEY
ROYAL GLEN MADSEN
LAWRENCE R. PUGH
BY THEIR ATTORNEYS.
HARRIS, KIECH, FOSTER & HARRIS
BY Clarence F. Kiech INVENTORS.
MICHAEL E. STICKNEY
ROYAL GLEN MADSEN
LAWRENCE R. PUGH
BY THEIR ATTORNEYS.
HARRIS, KIECH, FOSTER & HARRIS
BY Clarence F. Kiech

APPARATUS FOR RECORDING AND REPRODUCING VARIABLES

Filed Sept. 15, 1950 9 Sheets-Sheet 8

INVENTORS.
MICHAEL E. STICKNEY
ROYAL GLEN MADSEN
LAWRENCE R. PUGH
BY THEIR ATTORNEYS.
HARRIS, KIECH, FOSTER & HARRIS
BY
Laurence F. Kiech INVENTORS.
MICHAEL E. STICKNEY
ROYAL GLEN MADSEN
LAWRENCE R. PUGH
BY THEIR ATTORNEYS.
HARRIS, KIECH, FOSTER & HARRIS
BY
Clarence F. Kiech United States Patent Office 2,777,354 Patented Jan. 15, 1957

2,777,354

APPARATUS FOR RECORDING AND REPRODUCING VARIABLES

Michael E. Stickney, Alhambra, Calif., Royal Glen Madsen, Greenwich, Conn., and Lawrence R. Pugh, Monrovia, Calif., assignors to Beckman Instruments, Inc., South Pasadena, Calif., a corporation of California Application September 15, 1950, Serial No. 185,122

14 Claims. (Cl. 88—14)

The present invention relates to apparatus for recording variables of various types and for subsequently reproducing the recorded variables, either in their original forms, or in other forms. The present invention is related to that disclosed in the co-pending application of Royal Glen Madsen, Michael E. Stickney and Roland C. Hawes, Serial No. 168,308, filed June 15, 1950, Patent No. 2,698,411, issued December 28, 1954, and assigned to the assignee of the present application.

More particularly, the present invention relates to an apparatus for recording variations in any desired variable and for subsequently reproducing the recorded variations as variations in a quantity which is representative of the original variable, such a representative quantity being regarded hereinafter as either the original variable, or another variable which is a function of the original variable. For example, the invention is applicable to recording such variables as mechanical movements, voltages, pressures, temperatures, radiation intensities, and the like, and to subsequently reproducing these, or other variables, as quantities which are representative of the original variables. As a more specific example, the invention is applicable to recording a variable such as mechanical movement, i. e., to recording variations in the position of a mechanical element, and to subsequently reproducing the recorded mechanical movement either by duplicating the original variations in the position of the original mechanical element, by applying the original mechanical movement to some other mechanical element, by translating the original mechanical movement into variations in a voltage or other electrical characteristic, or the like. Similarly, the invention is applicable to recording a variable electrical characteristic, such as voltage, current, amplitude, frequency, and the like, and to subsequently reproducing such a variable electrical characteristic either in its original form, or in the form of some other variable, such as another electrical characteristic, a mechanical movement, or the like. Thus, in view of these examples, which are not intended to be limiting, it will be appreciated that the invention is susceptible of a wide variety of applications requiring recording of a variable and subsequent reproduction there of either in its original form or in the form of a related variable, the provision of such an information recording and reproducing apparatus being a primary object of the invention.

While, as indicated in the preceding paragraph, a primary object of the invention is to provide an apparatus which is capable of recording divers variables and of reproducing such variables in the form of various quantities, which may or may not be the same as the original variables, the invention will be exemplified hereinafter as embodied in an apparatus for recording a mechanical movement and for subsequently reproducing or reiterating such a mechanical movement, merely as a matter of convenience and without necessarily limiting the invention. There are many fields of application of the invention as embodied in apparauts for recording and reiterating mechanical movements, examples being the recording and duplicating of machine tool movements, spectrophotometer drive movements, camera movements in motion picture photography, and the like. It will be understood that the apparatus disclosed in detail hereinafter may be employed for recording and reproducing variables other than mechanical movements readily by converting or translating the variables to be recorded into mechanical movements for application to the apparatus, although the same effect may be attained in other ways as will be suggested hereinafter. The disclosure of such applications of the invention will enable those skilled in the art to practice other applications thereof readily.

Considering the invention more specifically, an important object thereof is to provide an information recording and reproducing apparatus or system for transforming or translating any variation in a variable into a phase variation of a cyclical function relative to a noncyclical or fixed reference, which phase variation may be any desired number of cycles of the cyclical function, subsequently recording the cyclical function, thereafter detecting any phase variation in the recorded cyclical function with respect to a noncyclical reference, and, finally, transforming or translasting such a variation in the phase of the cyclical function into a variation in a variable which is either the same as the original variable, or a function thereof. Expressed somewhat differently, it is an object of the invention to provide a recording and reproducing apparatus which includes (1) means responsive to any variation in a variable for generating a cyclical function and for varying the phase of the cyclical function with respect to a noncyclical or fixed reference as a particular function of the variation in the variable, (2) means for recording the cyclical function on a movable recording medium, such as a tape, lengthwise of the recording medium, (3) means for detecting any variation in the phase of the recorded cyclical function with respect to a noncyclical reference, such as a point on the recording medium, and (4) means for translating any variation in the phase of the detected cyclical function relative to the reference employed into a variation in a quantity representative of the original variable, such a quantity being, as hereinbefore discussed, either the same as or differing from the original variable. Considering item (1) above from a somewhat different point of view, it may be regarded as a means for generating a cyclical function the frequency of which varies as a particular function of a rate of variation of the desired variable.

An important object of the invention is to provide an apparatus for recording a variable which includes means for generating at least two cyclical functions which are out of phase with respect to each other and the phases of which vary with respect to a reference in proportion to a variation in the variable, and which includes means for simultaneously recording the cyclical functions. A related object is to provide means for reproducing the variable, either in its original form, or in a different form, which includes detecting means operable on the record of the cyclical functions for detecting any variations in the phases of the recorded cyclical functions relative to a reference, and which includes means controlled by the detecting means for translating any variations in the phases of the detected cyclical functions into variations in a quantity representative of the original variable.

Expressed somewhat differently, an important object of the invention is to provide a recording apparatus which includes means for translating the desired variable into a rotating function the phase of which varies in proportion to any variation in the variable, which includes means for translating the rotating function into at least two vector components which are out of phase with respect to each other, and which include means for recording the vector components in side-by-side relation upon a movable recording medium, such as a tape, in the direction of movement of the recording medium. A related object is to provide a reproducing apparatus which includes detecting means operable on the recording medium for detecting the recorded vector components continuously as the recording medium moves past the detecting means, which includes means for adding or combining the vector components vectorially to reproduce the rotating function, and which includes means for translating the rotating function into a quantity representative of the original variable, such quantity being either the same as or differing from the original variable.

Another important object of the invention is to provide a recording and reproducing apparatus in which the direction and speed of movement of the tape or other recording medium during reproduction is entirely independent of the direction and speed of movement of the tape during recording. In other words, during reproduction, a quantity representative of the original variable may be generated with rates of variation which are many times the corresponding rates of variations of the original variable, or but fractions thereof, and may be generated either with the same direction of variation as the original variable, or with a reverse direction of variation.

Another important object of the invention is to provide an apparatus for recording and reproducing variables which is capable of recording and reproducing two or more variables in precise relation to one another.

In the foregoing connection a particularly important object is to provide an apparatus for recording the relationship between two variables, one of which may be regarded as an independent variable and the other as a dependent variable, wherein the independent variable controls the speed of movement of the tape or other recording medium and wherein the dependent variable controls the frequency of generation of the cyclical functions recorded on the tape.

Another object is to provide a recording apparatus capable of recording two or more variables wherein a corresponding number of cyclical-function generators are provided and are respectively controlled by the variables to be recorded, the cyclical functions produced by the generators preferably being recorded side-by-side upon a common recording medium in the direction of movement of such medium. A related object is to provide a reproducing apparatus having detecting means for detecting phase variations corresponding to the respective recorded variables and for translating such phase variations into variations in quantities respectively representative of the original variables.

An important object of the invention is to provide apparatus capable of recording and reproducing two or more variables varying in time with high precision in relation to one another regardless of variations which may occur in the speed of the recording medium either during recording or reproduction. In other words, if each variable is expressed as a function of another, this functional relationship may be reproduced at high precision on playback, even if the functional relationships of the variables with time are not accurately reproduced.

While the cyclical function or functions corresponding to the variables to be recorded may be impressed or recorded on other recording media, such as rotatable discs or cylinders, we prefer to employ a movable tape for the recording medium, such tape having any desired recording characteristics. In other words, the present invention may employ as the recording medium a photosensitive tape, i. e., a strip of film, on which the desired cyclical function or functions may be impressed photographically, a magnetizable tape on which the desired cyclical function or functions may be impressed by means of magnetizing recording heads, a wax-coated tape on which the desired cyclical function or functions may be impressed mechanically, an electrolytic tape on which the desired cyclical function or functions may be impressed in the same manner as in some oscillographs, and the like.

An important object in connection with one embodiment of the invention is to provide a recording apparatus which includes means for moving a photosensitive tape past a cyclical-function generator and to provide means for impressing the cyclical function or functions generated by the generator on the tape photographically as it is moved past the generator.

Another object in this connection is to provide a cyclical-function generator which includes a rotatable cylinder having on its circumference at least one cycle of a cyclical function, and to provide means for continuously impressing on the photosensitive tape a vector component of each of the cyclical functions.

Another object is to provide a recording apparatus wherein the cyclical-function generator includes a rotatable cylinder having on its circumference circumferential areas each bounded on one side by at least one cycle of a cyclical function. A related object is to provide such a generator wherein one side of each circumferential area on the cylinder defines at least one cycle of a sine wave. Such areas are sinusoidally variable in width as a function of angular position on the cylinder.

Another object is to provide a recording apparatus wherein a narrow strip of the circumference of the cylinder is continuously photographed by the photosensitive tape through a slit extending lengthwise of the cylinder so that vector components of the sine waves, or other cyclical functions, are recorded on the tape longitudinally thereof in side-by-side relationship.

Another object is to provide such a recording apparatus wherein the position of the photosensitive tape may be varied in proportion to a variable which may be nonuniform with respect to time, and which may be designated as the independent variable, and wherein the position of the generating cylinder may be varied in proportion to another variable, which we may designate as the dependent variable. An important object in this connection is that the relationship between two variables may be recorded on such a recording apparatus by varying the position of the tape in proportion to variation in the independent variable, and varying the position of the cylinder in proportion to variations in the dependent variable.

Another object is to provide such a photographic recording apparatus which includes a cylinder having on its circumference circumferential areas which define at least one cycle of each of two or more cyclical functions which are out of phase with respect to each other. Thus, when the cylinder is rotated in accordance with any variation in the variable to be recorded, the rotating cylinder represents a rotating function which is translated into two or more out-of-phase vector components which vary in magnitude as a function of the position of the cylinder and whose vectorial arm is a rotating vector the phase angle of which varies in magnitude in proportion to any variation in the variable producing rotation of the cylinder, which is an important feature of the invention.

Another object is to provide a recording apparatus for recording a variable on a magnetizable tape which includes rotatable means for moving two or more magnetic recording heads relative to the tape in out-of-phase relationship so as to produce on the magnetizable tape a corresponding number of cyclical functions in out-of-phase relationship. In this instance, the rotatable means for moving the magnetic recording head represents a rotating function which varies in accordance with any variations in the variable, and which is translated into two or more out-of-phase vector components, the magnitudes of which vary in accordance with the phase of the rotating function.

Considering the apparatus of the invention for reproducing a variable recorded on a photosensitive tape in the manner hereinbefore discussed, the cyclical function or functions recorded on the tape are arranged in side-by-side relation on the tape and extend lengthwise thereof, such functions being defined by opaque and transparent areas of the tape. An important object of the invention is to provide a reproducing apparatus having means for scanning such a tape and for converting any variations in the phases of the cyclical functions occurring lengthwise of the tape into a cyclical information signal which may be utilized to vary a quantity representative of the original variable in proportion to corresponding variations in the original variable as recorded on the tape.

An important object in this connection is to provide a polarizing system for converting the varying transparency of the tape resulting from the cyclical functions recorded thereon into a cyclical carrier or information signal having a phase angle determined by the phases of the cyclical functions on the tape relative to any desired reference point on the tape.

More particularly, an object is to provide a scanning means for the tape which includes a radiation source, such as a source of visible radiation, on one side of the path of the tape in the reproducing apparatus, which includes a radiation-sensitive device, such as a photocell, on the opposite side of the path of the tape so that the ratiation transmitted by the tap impinges on the radiation-sensitive device, and which includes polarizing means for converting the radiation transmitted by the tape into the aforementioned cyclical information signal.

Another object in this connection is to employ in the radiation beam intermediate the radiation source and the path of the tape or rotatable polarizer, and to employ in the radiation beam intermediate the radiation-sensitive device and the path of the tape stationary polarizers having different polarization angles and respectively disposed opposite the cyclical functions recorded on the tape.

Another object is to provide means for generating a cyclical reference signal for use as a phase reference for the cyclical information signal generated in the foregoing manner.

As hereinbefore indicated, a feature of the present invention is that the relationship between two variables may be recorded by rotating the cyclical-function generator in porportion to any variation in one of the variables and by simultaneously moving the tape on which the cyclical function is recorded in proportion to any variation in the other variable. In instances where physical manifestations of the variations in the two variables, such as a variations in the positions of two movable elements, variations in electrical characteristics, and the like, are available, such a record may be produced by rotating the cyclical-function generator in accordance with variations in one of the variables and by simultaneously moving the tape in proportion to variations in the other variable. However, in some instances, the precise functional relationship between two variables, is directly available, but must be determined empirically, or by calculations, the desired functional relationship between the two variables then being available in tabular or graphic form.

An important object of the invention is to provide an apparatus for recording such a functional relationship between two variables which includes a control means for rotating the cyclical-function generator in proportion to one co-ordinate of the functional relationship and for simultaneously moving the tape in proportion to the other co-ordinate of the functional relationship. Thus, a record or any desired function, whether linear or nonlinear, may be produced, which is an important feature of the invention.

It will be noted that in the recording and reproducing apparatus hereinbefore discussed in a general way, it is necessary to refer the phase or phases of the cyclical function or functions recorded on the tape to some starting or reference point on the tape, which may be arbitrarily selected. In other words, the representative quantity which is to be varied in accordance with variations in the original variable must be initially positioned relative to the tape, before reproduction, within a range of one cycle of the cyclical function recorded on the tape. Expressed somewhat differently, the apparatus partially positions, within one cycle, the representative quantity to be varied with respect to the cyclical function recorded on the tape, such a system logically being termed a "partial positioning" system. Thus, it is necessary to synchronize the representative quantity to be varied with the cyclical function recorded on the tape within one cycle initially, the apparatus providing absolute synchronization thereafter.

However, the apparatus of the invention may be provided with means for rendering it "absolute positioning" and the provision of such a means is an important object of the invention. More particularly, this may be accomplished by gearing or otherwise connecting to the cyclical-function generator another cyclical-function generator which generates an auxiliary cyclical function the phase variation or phase progression of which does not exceed 360° for the entire phase variation of the cyclical function corresponding to the variable being recorded, phase variations of the latter of many times 360° being possible. Preferably, the auxiliary cyclical function may be recorded on the tape alongside the cyclical function or functions corresponding to the variable being recorded. Thus, by providing a reproducing apparatus having detecting means for the auxiliary cyclical function, an absolute positioning system may be attained without any necessity for even approximate initial positioning, which is an important feature of the invention.

For absolute positioning in a system wherein the total number of cycles of progression is so large that positioning error occurring in the use of the auxiliary cyclical function, due to inherent backlash of the system and other causes, results in a corresponding error in the main cyclical positioning function of one cycle or more, a cascade of generators of reference cyclical functions may be employed, attention in this connection being directed to the aforesaid co-pending application Serial No. 168,308, wherein a similar arrangement is disclosed in detail.

While, as hereinbefore suggested, many applications of the present invention are possible, it is particularly applicable to spectrophotometry and applications thereof to spectrophotometry will be considered hereinafter as a matter of convenience without any intention of limiting the generic invention thereto. A spectrophotometer includes, in essence, a movable wavelength-varying means, movable means defining variable entrance and exit slits for respectively admitting radiation to and receiving radiation from the wavelength-varying means, slit drive means operatively connected to the slit-defining means to vary the widths of the entrance and exit slits, wavelength drive means operatively connected to the wavelength-varying means to vary the wavelength of the radiation directed toward the exit slit, and means adapted to receive radiation from the exit slit for generating an output signal.

An important object of the present invention in connection with such a spectrophotometer is to provide a recording apparatus in which the wavelength drive means drives the tape and in which the slit drive means drives the rotatable cyclical-function generator so that variations in the position of the slit-drive means as a function of the position of the wavelength drive means is recorded on the tape in the form of a single cyclical function, or a single set or channel of out-of-phase cyclical functions, the phase, or phases, of which vary lengthwise of the tape as a function of the position of the slit-drive means. When a relationship of the positions of the wavelength-varying means and the slit-defining means is so recorded, the tape may be driven by the wavelength drive means in the reproducing apparatus and the detecting means may be employed to control the slit drive means so as to precisely duplicate the relative positions assumed by the wavelength-varying means and the slit-defining means during recording, which is an important feature of the invention.

As more fully discussed in the aforesaid co-pending application Serial No. 168,308, the output-signal generating means of the spectrophotometer may control a device for making a record of the intensity of the radiation incident thereon on a movable chart or chart means which is driven by a chart drive means at a speed which is a function of the speed of the wavelength-varying means. Thus, the record on the chart is a record of the intensity of the transmitted radiation with respect to wavelength. However, as pointed out in the aforesaid co-pending application Serial No. 168,308, a characteristic of conventional wavelength-varying means employed in spectrophotometers is that the relationship between the wavelength directed toward the exit slit thereby and the corresponding positions of the wavelength-varying means is a nonlinear function. Consequently, if the chart is driven by the wavelength drive means directly, the wavelength scale on the chart is nonlinear, which is undesirable.

In view of the foregoing, an important object of the present invention is to provide a control means operatively connecting the chart means to the wavelength drive means for so operating the chart drive means as to drive the chart linearly with respect to wavelength.

More particularly, an important object of the present invention is to provide a control means which includes a cyclical record having a phase-length, i. e., phase versus length, relationship which is the same non-linear function as the wavelength-position, i. e., wavelength versus position, relationship of the wavelength-varying means. Differently expressed, an important object of the present invention is to provide a control means for the chart drive means which includes such a cyclical record operatively connected to the wavelength drive means to be driven thereby, which includes detecting means operable on the cyclical record for detecting any variations in the phase of the cyclical record occurring lengthwise thereof, and which includes means operatively connecting the chart drive means to the detecting means for operating the chart drive means in accordance with any phase variations detected by the detecting means so as to drive the chart linearly with respect to wavelength.

Before proceeding to a detailed disclosure of exemplary embodiments of the present invention and exemplary applications thereof, it might be well to point out that the recording apparatus of the present invention produces, in effect, a cam which is utilized in the reproducing apparatus to produce variations in one or more representative quantities in accordance with corresponding variations in one or more variables which were "built" into the cam during the recording operation. Thus, in effect, the recording apparatus of the invention constitutes a means for making a cam and the reproducing apparatus of the invention constitutes a means for utilizing the cam to reproduce the original variable, or to produce quantities representative thereof.

The foregoing objects and advantages of the present invention, together with various other objects and advantages thereof which will become apparent, may be attained with the exemplary embodiments of the invention which are illustrated in the accompanying drawings and which are described in detail hereinafter. As a matter of convenience, the information recording and reproducing apparatus of the invention will be considered first in a general way with reference to recording movements of mechanical elements and to reproducing such movements of the same elements, but without reference to any specific applications of the apparatus. Thereafter, the recording and reproducing apparatus will be considered as applied to the wavelength and slit drives of a spectrophotometer and to the wavelength and chart drives of a spectrophotometric apparatus for the purpose of illustrating practical applications of the invention.

Also, since many of the elements of the electrical circuits incorporated in the reproducing apparatus of the invention are conventional, the drawings are largely schematic. Further, the recording and reproducing apparatuses are illustrated in separate, correlated schematic diagrams in most instances as a matter of convenience. Referring to the drawings:

Fig. 1 is a simplified diagrammatic view of a recording apparatus or system of the invention;

Fig. 2 is a simplified diagrammatic view of a reproducing apparatus or system of the invention which is the counterpart of the recording apparatus illustrated in Fig. 1;

Figure 9:
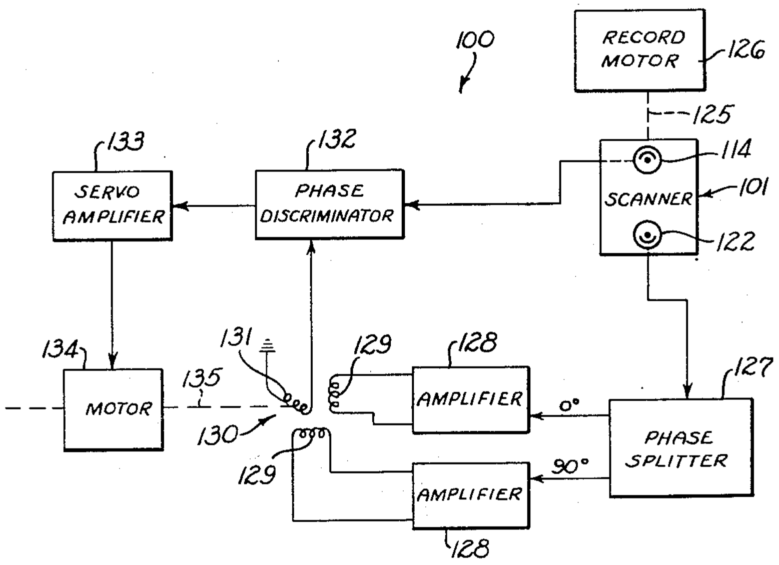
Fig. 9 is a diagrammatic view of one embodiment of the reproducing apparatus illustrated generally in Fig. 2 and incorporating the detecting means illustrated in Figs. 7 and 8, the detecting means being illustrated in block form in Fig. 9.
Figure 13:
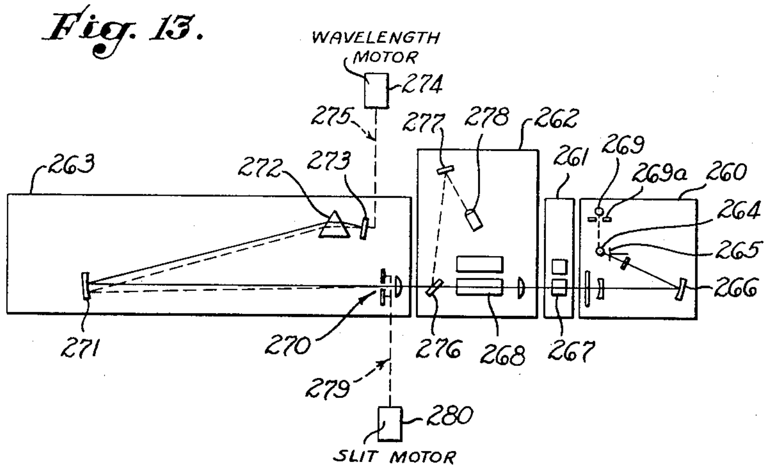
Fig. 13 is a diagrammatic view of a spectrophotometer to which the recording and reproducing apparatus of the invention may be applied for the purpose of controlling the slit and chart drives of the spectrophotometer as required functions of wavelength drive position.
Figure 17:
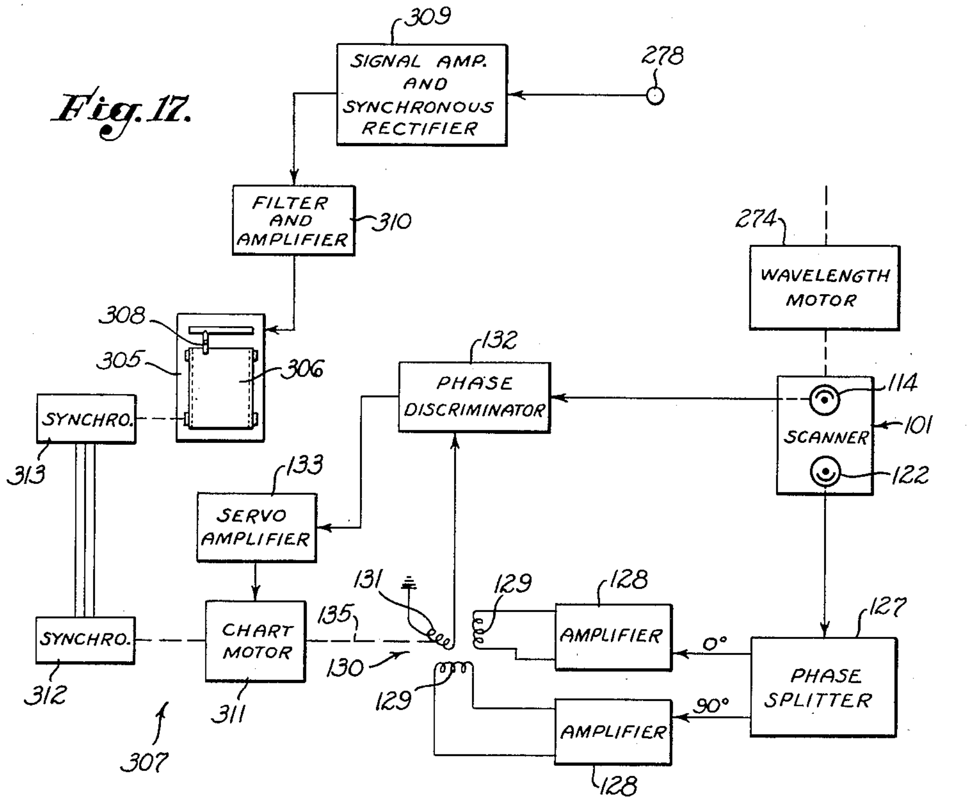
Figure 18:
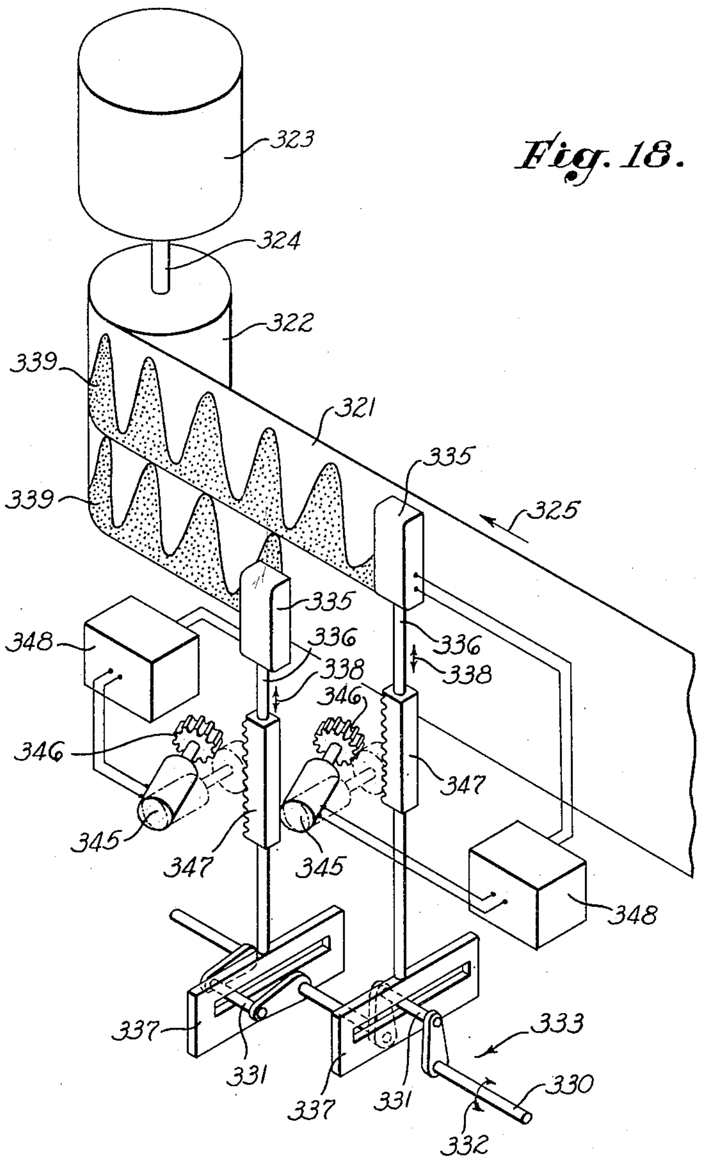

Fig. 17 is a diagrammatic view illustrating an application of the embodiment of Fig. 9 to the spectrophotometer of Fig. 13 and to a chart means associated with such spectrophotometer for the purpose of correlating the operation of the wavelength drive means of the spectrophotometer with the operation of a drive means for the chart means; and Fig. 18 is a diagrammatic perspective view illustrating an alternative embodiment of a recording and reproducing apparatus of the invention.

Referring first to Fig. 1 of the drawings, diagrammatically illustrated therein in simplified form is an apparatus 20 of the invention for recording variations in a desired variable. The apparatus 20 includes a recorder 21 for impressing or recording variations in the variable on a movable recording medium, exemplified as a movable tape 22 which may be photosensitive, magnetizable, or the like. The tape 22 is adapted to be moved unidirectionally with respect to the recorder 21, as indicated by the arrow 23. The recording apparatus 20 includes rotatable means for driving the tape 22 unidirectionally in the direction of the arrow 23, the rotatable driving means being exemplified as a sprocket 24 having teeth which are insertable into perforations along the edges of the tape. The sprocket 24 may be driven through a shaft 25 in any desired manner, i. e., manually, electrically hydraulically, mechanically, or the like. In the particular construction illustrated, the shaft 25 is exemplified as being adapted to be rotated unidirectionally in the direction of the arrow 26 by a hand crank 27.

The variable to be recorded on the tape 22 by the recorder 21 is introduced into the recorder in the form of a rotary function, as by a shaft 31. The rotary function corresponding to the variable to be recorded may be either unidirectional or bidirectional, this being indicated by the bidirectional arrow 32 applied to the shaft 31. The variable to be recorded may be rotary function in itself, or, if not, it may be converted into a rotary function applied to the shaft 31 in any suitable manner. For example, an electrical variable, such as voltage, may be converted or translated into a rotary function and applied to the shaft 31 in much the same manner as such an electrical variable is converted into a rotary function in a meter for indicating the magnitude thereof. Similarly, a variable such as pressure may be converted into a rotary function applied to the shaft 31 by means of a mechanism such as that incorporated in a pressure gauge. As another example, nonrotary mechanical movements may be translated into rotary functions for application to the shaft 31 by suitable gearing, or the like. Thus, it will be seen that any variable which is a rotary function in itself may be applied directly to the shaft 31 and divers variables which are normally nonrotary functions may be applied to the shaft 31 by first converting them in any suitable manner into rotary functions. For the purposes of illustration in the simplified form of the recording apparatus 20 illustrated in Fig. 1, the shaft 31 is illustrated as adapted to be rotated bidirectionally by means of a hand crank 33.

Considering the operation of the recording apparatus 20, the shaft 25 for moving the tape 22 is rotated unidirectionally, as indicated by the arrow 26, so as to drive the tape unidirectionally, as indicated by the arrow 23. While it is necessary that the movement of the tape be unidirectional, the speed of the tape need not be constant and may be varied throughout a wide range if desired. As the tape 22 is being driven in the foregoing manner, the shaft 31 is rotated to generate a rotary function, the angular phase of which varies with any variation in the variable to be recorded. In other words, the angular phase or position of the shaft 31 varies as a function of any variation in the magnitude of the variable to be recorded, and preferably varies in proportion to any variation in the magnitude of the variable to be recorded. It is important to note that the angular phase or position of the rotary function represented by the shaft 31 is not limited to one cycle, i. e., one revolution of the shaft 31, but may be any desired number of cycles, or any desired fraction of one cycle. Also, as hereinbefore indicated, the rotation of the shaft 31 may be either unidirectional or bidirectional. In other words, the angular phase or position of the shaft 31 may continually increase, or it may increase and decrease in any desired relation, depending upon the nature of the variable to be recorded. Also, if rotation of the shaft 31 in one direction be regarded as positive and rotation thereof in the other direction be regarded as negative, it will be noted that the change of angular phase or position of the shaft may be either positive or negative, or positive and negative in any desired relationship depending upon the directions of rotation of the shaft and depending ultimately upon the nature of the variable to be recorded. As will be discussed in more detail hereinafter, the recorder 21 is adapted to record the angular phase or position of the shaft 31 on the tape 22 in the form a cyclical function which extends longitudinally of the tape, the phase of this cyclical function varying lengthwise of the tape with respect to any desired reference point on the tape, such as the starting point of the recording operation, in precisely the same manner as the phase of the rotary function represented by the shaft 31 varies with respect to a suitable reference, such as the starting point of the recording operation.

Referring now to Fig. 2 of the drawings, diagrammatically illustrated therein in simplified form is a reproducing apparatus 40 of the invention which is the counterpart of the recording apparatus 20 and which is adapted to generate a quantity representative of the original variable recorded on the tape 22 by the recording apparatus 20, such a representative quantity being either the same as the original variable, or differing therefrom, as desired. Considering the reproducing apparatus 40 in more detail, it includes a detector 41 relative to which the tape 22 having the original variable recorded thereon is adapted to be moved by a rotatable driving means which is exemplified as a sprocket 42 having teeth insertable into the perforations along the edges of the tape 22. The sprocket 42 may be driven in any desired manner through a shaft 43 connected thereto, i. e., the sprocket 42 may be driven through the shaft 43 manually, electrically, hydraulically, mechanically, and the like. As a matter of convenience, the shaft 43 is illustrated as adapted to be driven by a hand crank 44.

The detector 41, as will be discussed in more detail hereinafter, is adapted to detect the cyclical function recorded on the tape 22 by the recording apparatus 20 and to apply the detected cyclical function to a translator 45 which converts or translates the detected cyclical function into a quantity representative of the original variable recorded by the recording apparatus 20, such representative qauntity being either the same as or differing from the original variable, as desired. In the particular construction illustrated, the translator 45 is shown as having connected thereto a shaft 46 the angular phase or position of which is varied by the translator in direct correspondence with variations in the phase of the cyclical function recorded on the tape and detected by the detector 41. The rotation of the shaft 46 driven by the translator 45 may be either unidirectional, or bidirectional, as indicated by the arrow 47 and as determined by the directions of phase variation of the cyclical function recorded on the tape 22. Thus, it will be seen that the recording apparatus 20 is capable of recording a rotary function which may be either unidirectional or bidirectional, or both, and the particular embodiment of the reproducing apparatus illustrated is capable of precisely duplicating the recorded rotary function.

It will be noted that, as indicated by the bidirectional arrow 48 on the tape, the tape 22 may be moved either unidirectionally or bidirectionally, or both, during the reproducing operation, the corresponding rotation of the sprocket shaft 43 being designated by the bidirectional arrow 49. Thus, variations in the recorded variable may be reproduced in a sequence which is the reverse of the sequence in which such variations were recorded, as well as being reproducible in the same sequence as that in which they were recorded. Also, the tape 22 may be driven relative to the detector 41 in one direction for a predetermined period to reproduce particular variations in the recorded variable, in the original sequence, and may then be reversed to duplicate the reproduction of such variations in reverse order, if this is desired for any reason. As will be apparent, during reproduction, variations in the original variable may be reproduced in their original and reverse sequences in any desired relationship merely by varying the rotation of the sprocket shaft 43 in accordance with the desired relationship.

Figure 4:
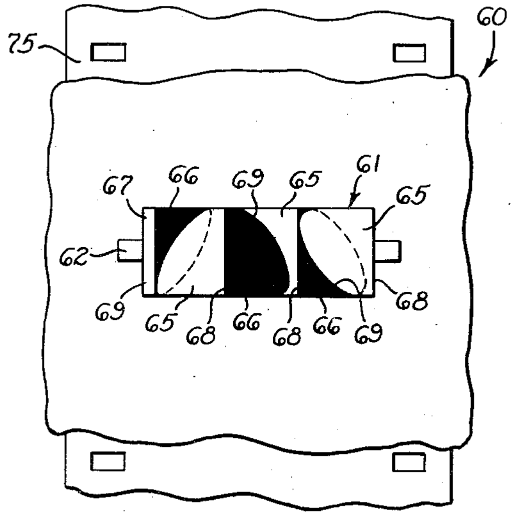
Fig. 4 is an elevational view taken as indicated by the arrows 4—4 of Fig. 3.
Figure 3:
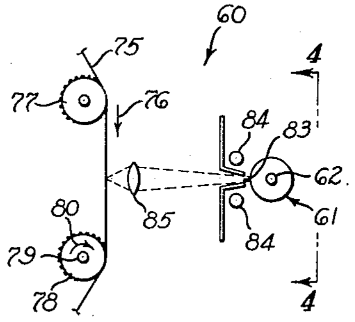
Fig. 3 is a diagrammatic view of one embodiment of the recording apparatus illustrated generally in Fig. 1.
Figure 5:
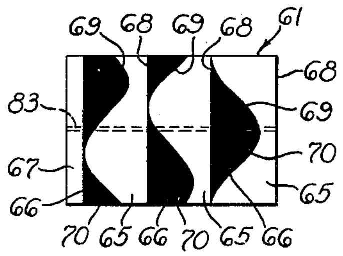
Fig. 5 is a developed view of a cyclical-function generator of the recording apparatus illustrated in Figs. 3 and 4.

Referring now to Figs. 3 to 5 of the drawings, illustrated in detail therein is a recording apparatus 60 of the invention which may be regarded as one embodiment of the recording apparatus 20 illustrated generally in Fig. 1 of the drawings. The recording apparatus 60 includes a cylinder or drum 61 which is adapted to be rotated, as by a shaft 62 connected thereto, at rates proportional to rates of variation of the magnitude of a variable to be recorded. Thus, the motion of the rotary cylinder 61 may be regarded as a rotary function the angular phase or position of which varies in proportion to any variation in the magnitude of the variable to be recorded, as hereinbefore discussed in detail. The variable may in itself be a rotary function and may be operatively connected to the cylinder 61 directly through the shaft 62, or, if it is not a rotary function in itself, it may be converted or translated into a rotary function operatively connected to the cylinder through the shaft 62, as hereinbefore indicated.

The circumference or circumferential surface of the cylinder 61 is divided into alternate light and dark areas, preferably white and black areas 65 and 66, which are arranged side by side longitudinally of the cylinder and which extend circumferentially of the cylinder. A white band 67 extending circumferentially of the cylinder 61 at one end thereof bounds the black area 66 adjacent such end of the cylinder. Each of the black areas 66 is bounded on one side by a circumferential line 68 disposed in a plane normal to the axis of rotation, and is bounded on its other side by a circumferential line 69 disposed in a plane which is inclined with respect to the axis of rotation of the cylinder. The angles of inclination of the inclined planes defining the lines 69 are equal, but the directions thereof differ in such a manner that the points of maximum width of the black areas 66, i. e., the points of maximum extent of the black areas longitudinally of the cylinder, are spaced apart circumferentially of the cylinder. In the particular embodiment illustrated, three black areas out of phase by 120° are shown, but the number and phase displacements may be varied if desired.

As best shown in Fig. 5 of the drawings, which is a developed view of the circumference of the cylinder 61, this arrangement of the white and black areas 65 and 66 provides on the circumference of the cylinder three variable-width cyclical variations 70 which are defined by the black areas 66, the cyclical variations 70 being positioned side by side on the circumference of the cylinder and being separated by the white areas 65. With the particular construction illustrated wherein the lines 69 separating the white areas 65 from the black areas 66 are disposed in planes inclined at the same angle relative to the axis of rotation of the cylinder, but in directions differing in such a manner that the points of maximum width of the black areas are spaced 120° apart circumferentially of the cylinder, the cyclical variations 70 represent single cycles of sine waves which are 120° out of phase. Thus, considering the variations in the widths of the black areas as the cylinder 61 is rotated, one complete cycle of width variation 70 is generated for each revolution of the cylinder, the phase or phase angle of each cyclical width variation thus being proportional to the phase or phase angle of the rotary function represented by the rotary cylinder 61, and thus being proportional to a variation in the magnitude of the variable producing rotary movement of the cylinder. In other words, the number of cycles of each width variation, considered with respect to a fixed reference, which is generated by rotation of the cylinder 61 is proportional to the corresponding variation in the magnitude of the variable, considered with respect to some fixed reference, and the frequency of the cyclical width variation throughout a particular range of rotation of the cylinder is proportional to the corresponding rate of variation of the magnitude of the variable.

While the cylinder 61 has been illustrated as a cyclical function generator, employing sine wave surface areas, it will be understood that the present invention is not necessarily limited to use of cyclical areas of the form shown. For example, the cylinder 61 may employ other cyclical patterns, the natures of the generated functions then depending correspondingly upon the relationship between the white and black areas 65 and 66. Also, while the cylinder 61 has been illustrated as using a pattern of three sine waves out of phase by 120°, it will be understood that the number and phase relationship of the sine waves may be varied. For example, the circumference of the cylinder 61 may be provided with white and black areas so arranged that the surface of the cylinder provides two sine waves, or other cyclical functions 90° out of phase.

Another way of regarding the cylinder or generator 61 is that it is capable of resolving the rotating function represented by the rotary motion thereof into three vector components which are out of phase and which vary in magnitude as determined by variations in the phase angle of the rotating function. Such vector components are, of course, proportional to the widths of the cyclical variations 70 on the circumference of the generator 61.

In order to record the cyclical width variations 70, the phases of which vary in proportion to variations in the magnitude of the variable to be recorded, a photosensitive tape 75, such as a strip of motion picture film, is mounted for movement past the generator 61 in a plane parallel to the axis of rotation thereof, as indicated by the arrow 76. The photosensitive tape 75 may be trained over sprockets 77 and 78, the sprocket 78 being provided with a shaft 79 which may be rotated unidirectionally, as indicated by the arrow 80, to move the tape in the direction of the arrow 76. The shaft 79 corresponds to the shaft 25 of the recording apparatus 20, and, as hereinbefore discussed in detail, may be driven in any suitable manner to drive the photosensitive tape 75.

Disposed between the generator 61 and the photosensitive tape 75 is a slit 83 which extends longitudinally of the generator and transversely of the photosensitive tape, the slit 83 being very narrow so that only a narrow longitudinal strip of the circumference of the generator is in registry therewith as the generator rotates. The strip of the circumference of the generator 61 in registry with the slit 83 is illuminated by tubular lamps 84, such as fluorescent lamps, which are disposed on opposite sides of the slit, the photosensitive tape being shielded relative to the lamps in any suitable manner. Disposed between the slit 83 and the photosensitive tape 75 is a lens 85 which focuses the strip of the circumference of the generator 61 which is visible through the slit on the photosensitive tape 75 to record or impress such strip of the circumference of the generator on the tape.

As will be apparent, when the photosensitive tape is moved relative to the generator 61 in any suitable manner and the generator is rotated, either unidirectionally or bidirectionally, successive longitudinal strips of the circumference of the generator are photographed on the tape 75. Thus, angular displacement of the sine waves on the circumference of the generator 61 produces a record on the photosensitive tape, one cycle of each width variation 70 being recorded on the tape for each revolution of the generator. Consequently, the instantaneous phase angle of each width variation recorded on the photosensitive tape 75 is proportional to the phase angle through which the generator has been rotated, considered with respect to suitable references. In other words, the phase of each width variation recorded on the photosensitive tape, i. e., the number of cycles of each cyclical width variation recorded on the photosensitive tape, varies in proportion to the corresponding variation in the magnitude of the variable applied to the generator, again considered relative to suitable references. For example, the phase of each width variation 70 recorded on the photosensitive tape may be referred to the point of the tape which was opposite the slit 83 upon initiation of the rotation of the generator 61, the initiation of rotation of the generator serving as a phase reference for the phase angle of the rotary function represented by the generator.

For any position on the tape, the sum of the vector magnitudes represented by the respective cyclical width variations is a rotary vector the phase angle of which varies in proportion to variations in the original variable.

Figure 6:
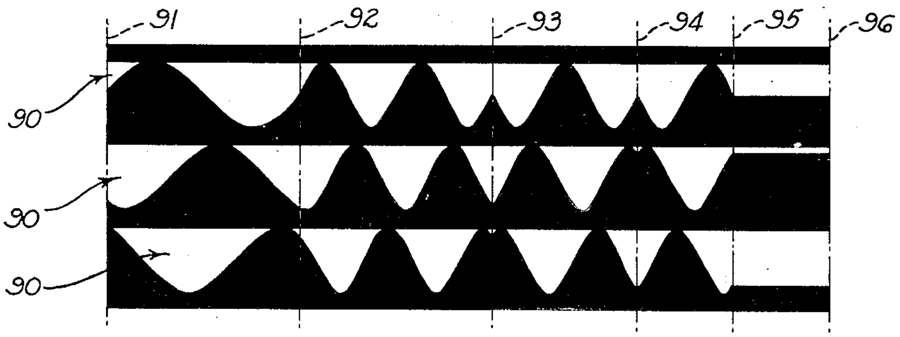
Fig. 6 is a plan view of a fragment of a record which is exemplary of the records obtainable with the recording apparatus of Figs. 3 to 5.

After the recording operation has been completed and the photosensitive tape 75 has been developed, the tape, as illustrated in Fig. 6, has recorded thereon three vector magnitude functions 90 which are transparent and which are separated by opaque areas, assuming that the photosensitive tape comprises ordinary motion picture film, the three vector magnitude functions being disposed side by side on the tape and extending longitudinally thereof.

Fig. 6 illustrates the type of record which is obtained when the rotary function representative of the recorded variable varies in both speed and direction, i. e., when the rate and direction of variation of the recorded variable undergo change. In the range bounded by the broken lines 91 and 92 extending transversely of the photosensitive tape 75 in Fig. 6, the generator 61 was rotating in one direction at a relatively low, constant speed, corresponding to a relative low and constant rate of variation of the variable. In the range bounded by the broken lines 92 and 93, the generator 61 was rotating in the same direction, but at a higher speed, corresponding to a variation of the recorded variable in the same direction, but at a higher speed. At the broken line 93, the direction of rotation of the generator 61 was reversed, corresponding to a reversal of the direction of variation of the recorded variable. Another reversal of the direction of rotation of the generator 61, corresponding to another reversal of the direction of variation of the variable, appears at the broken line 94. At the broken line 95, rotation of the generator 61 ceased, corresponding to a cessation of the variation of the variable. In the range between the broken lines 95 and 96, the generator 61 remained stationary, corresponding to a constant value for the variable recorded on the photosensitive tape. Thus, if the recorded variable is regarded as the position of a rotatable element, the rotatable element was rotating slowly in one direction in the range between the broken lines 91 and 92, was rotating in the same direction but at a higher rate in the range between the broken lines 92 and 93, was rotating in the opposite direction in the range between the broken lines 93 and 94, was again rotating in the original direction in the range between the lines 94 and 95, and was stationary in the range between the broken lines 95 and 96. The number of cycles of each vector magnitude function 90 between any point on the tape which is selected for consideration and a reference point thereon is equal to the number of revolutions of the rotatable element which occurred in the range between the selected point on the tape and the reference point thereon. Differently expressed, the phase angle of each vector magnitude function 90 at a particular point on the tape relative to a reference point thereon is proportional to the phase angle through which the rotatable element was rotated.

It is important to note that both positive and negative progressions of phase angle are recorded on the exemplary tape illustrated in Fig. 6 according to the direction of change of the rotary function, and this factor must be taken into consideration in determining the net phase angle of the rotatable element corresponding to a particular point on the tape. In other words, the number of cycles corresponding to rotation of the rotatable element in one direction must be subtracted from the number of cycles corresponding to rotation thereof in the opposite direction to obtain the net change in the phase angle, or net phase progression, of the rotatable element over a particular length of the tape.

In the reproducing apparatus to be described in the following paragraphs the signs of the phase progressions of the summation vector defined by the vector magnitude functions 90 are automatically accounted for so that the final value of the quantity representative of the original variable corresponds to the final value of the original variable.

Figure 7:
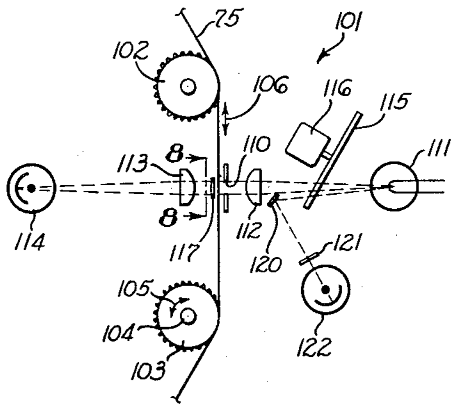
Fig. 7 is a diagrammatic view of a detecting means of one embodiment of the reproducing apparatus illustrated generally in Fig. 2.
Figure 8:
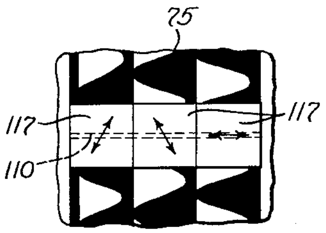
Fig. 8 is a sectional view taken along the broken line 8—8 of Fig. 7.

Referring now to Figs. 7 and 9 of the drawings, illustrated therein is a reproducing apparatus 100 which may be regarded as one embodiment of the reproducing apparatus 40 illustrated in simplified form in Fig. 2 of the drawings and which is adapted to reproduce the variable recorded on the photosensitive tape 75 by the recording apparatus 60, either in the original form of the variable, or in some other form. Referring particularly to Fig. 7, illustrated therein in diagrammatic form is a detecting or scanning means 101 for detecting the cyclical functions recorded on the developed photosensitive tape 75 in the recording apparatus 60. The tape 75 is adapted to be moved through the scanning means 101 and is trained over sprockets 102 and 103, the latter being provided with a shaft 104 which may be rotated in either direction, as indicated by the bidirectional arrow 105, to move the tape in either direction, as indicated by the bidirectional arrow 106.

As the tape 75 is moved through the scanning means 101, it is scanned as it passes in front of a narrow slit 110 the width of which may be of the order of magnitude of 0.01 inch and which is greatly exaggerated in the drawings. The slit 110 extends transversely of the path of the tape 75. Disposed on the same side of the path of the tape as the slit 110 is a radiation source, such as a lamp 111. Light emanating from the lamp 111 is collimated by a lens 112 disposed between the lamp and the slit 110 so that the light rays passing through the slit and the transparent portions of the tape are rendered parallel. Another lens, 113, is disposed on the opposite side of the path of the tape and focuses the light transmitted by the transparent areas of the tape onto a radiation-sensitive device, such as a photocell 114. Interposed in the light beam between the lamp 111 and the lens 112 is a disc of polarizing material, hereinafter termed a polarizer 115, which is rotated, preferably at a constant speed, by a motor 116. For example, the motor 116 may rotate the polarizer 115 at 60 revolutions per second. Disposed in the collimated portion of the beam, e. g., on the opposite side of the path of the tape and between the path of the tape and the lens 113, are stationary polarizers 117. The stationary polarizers are disposed behind the vector magnitude functions 90 on the tape, respectively, and have different polarization angles, the polarization angles of the polarizers differing by 60° for the respective 120° out-of-phase vector magnitude functions 90.

With this arrangement of optical and polarizing elements, the light passing through the vector magnitude functions 90 on the tape 75 is modulated by the polarizing means comprising the polarizers 115 and 117 to produce three cyclical signals, such signals having a frequency of 120 cycles per second and being 120° out of phase for the particular exemplary values hereinbefore cited. The photocell 114 adds these cyclical signals to produce a cyclical information signal having the form of a rotating vector of constant amplitude and a frequency of 120 cycles per second for the particular exemplary values hereinbefore noted. This cyclical information signal, i. e., the cyclical information signal generated by the photocell 114, has a phase angle which is a function of the position of the tape 75 relative to the slit 110 and which, therefore, is a function of the phase angle of the rotary function represented by the generator 61 of the recording apparatus 60. In other words, the variation of the phase of the cyclical information signal generated by the photocell 114 is proportional to the corresponding variation of the original variable recorded by the recording apparatus 60.

The following discussion gives the mathematical basis for the cyclical information signal generated by the photocell 114. Referring to Fig. 6, the light transmission governed by any one of the vector magnitude curves 90, arbitarily selected, may be regarded as being equal to $$A(\sin a+1)$$

assuming constant incident light on the slit 110. In Equation 1 above, A is a constant and $a$ is the phase angle of the vector magnitude function in question with respect to an arbitrary phase reference, which may be any desired point on the tape 75, such as the starting point of recording. Angle $a$ may also be defined by: $\sin a=s'/s$; where $s'$ is instantaneous white-area width on curve 90 and $s$ is maximum white-area width. The light transmitted by one of the vector magnitude functions 90 and represented by Equation 1 above is, however, modulated by the polarizing means comprising the polarizers 115 and 117 so that the over-all expression for transmission of the area under consideration is $$A(\sin a+1)B \sin^2 wt$$

In Expression 2 above, B is another constant, $w$ is the angular velocity of the rotating polarizer 115, and $t$ is time, taken as $t=0$ and $w=0$. The combined expression for all three vector magnitude functions 90 is $$A\,[\sin a+1]B \sin^2 wt+ A\left[\sin\left(a+\frac{2\pi}{3}\right)+1\right]B\left[\sin^2\left(wt+\frac{\pi}{3}\right)\right]+ A\left[\sin\left(a+\frac{4\pi}{3}\right)+1\right]B\left[\sin^2\left(wt+\frac{2\pi}{3}\right)\right] \quad (3)$$

Expression 3 above can be reduced to the form $$K[1+\tfrac{1}{2}\sin(2wt-a)] \quad (4)$$

In Expression 4 above, K is a composite constant. Disregarding the direct current component of this equation, it shows that the combined light transmission for all three sine functions, as modulated by the polarizing means, is a sine wave with an angular velocity of $2w$ and with a phase angle determined by $a$ which corresponds to the position of the tape 75 with regard to a fixed reference point thereon. This sine wave is the cyclical information signal discussed above and has a frequency of 120 cycles per second for the particular exemplary values hereinbefore used.

A small diagonal mirror 120 is interposed between the rotatable polarizer 115 and the path of the tape 75 so as to intercept part of the rotating polarized light transmitted by the polarizer 115, and directs the intercepted rotating polarized light through a stationary polarizer 121 onto a second photocell 122. Thus, assuming the same values as hereinbefore cited, the photocell 122 generates a cyclical reference signal having a frequency of 120 cycles per second, this cyclical reference signal being used as a phase reference for the cyclical information signal generated by the photocell 114.

The cyclical information signal, which varies in phase in proportion to the corresponding variation in the variable recorded by the recording apparatus 60 and discussed above, is phase-compared to the cyclical reference signal generated by the second photocell 122 and the resulting difference is employed to reproduce the rotary function corresponding to the original variable. The circuit for doing this is illustrated in block form in Fig. 9 of the drawings.

Referring to Fig. 9 of the drawings, the scanner or scanning means 101 is shown as having connected thereto by a shaft 125 a record motor 126 for driving the tape 75 through the scanner. However, the tape may be driven in any desired manner, as hereinbefore discussed. The reference signal or voltage from the second photocell 122 is split into two components, exemplified as 90° apart, by a phase splitter or phase-splitting means 127. The two components of the reference signal are amplified by amplifiers 128 and applied to field windings 129 of a synchro or selsyn 130. Although a two-phase system has been illustrated, a larger number of phases, for example three, may be employed. The rotor winding 131 of the synchro 130 is connected to a phase discriminator 132, as is the photocell 114 of the scanner 101. The output side of the phase discriminator or phase discriminating means 132 is connected through a servoamplifier 133 to a motor 134 which is connected by a shaft 135 to the rotor of the synchro 130 so as to control the position of the rotor winding 131. Thus, the cyclical information signal generated by the photocell 114 of the scanner 101 is phase-compared in the phase discriminator 132 with a cyclical feedback signal from the synchro 130 and any resulting error signal is amplified to drive the motor 134. Each time the tape 75 is moved to produce one complete cycle of the information signal change, i. e., through a phase angle of 360°, the synchro rotor is driven through one complete revolution, which corresponds to one complete revolution of the generator 61. Thus, the synchro rotor duplicates the motion of the generator 61 so that the position of the rotor for any tape position duplicates the corresponding position of the rotary function at the same tape position, corresponding to the originally recorded variable. Thus, it will be seen that if the originally recorded variable is the angular position of a rotatable element, for example, the synchro rotor duplicates the original motion of the rotatable element.

As hereinbefore discussed in detail, the tape may be moved bidirectionally during reproduction or playback so that the direction of variation of the original variable may be reversed, or alternately reversed and reproduced, as desired. This feature is particularly valuable where a particular range of variations of the original variable must be investigated carefully since it permits repeated reproduction of the variations occurring in such range.

Figure 10:
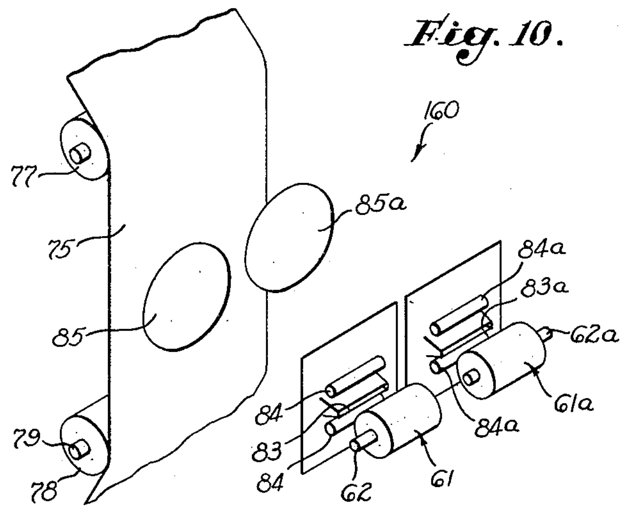
Fig. 10 is a perspective view illustrating diagrammatically one embodiment of a recording apparatus of the invention for recording two variables, the embodiment of Fig. 10 being similar to that illustrated in Figs. 3 to 5.

In Fig. 10 of the drawings is illustrated a recording apparatus 160 of the invention which is adapted to record two variables side by side upon a single photosensitive tape. The recording apparatus 160 is identical to the recording apparatus 60 described previously except that two generators 61, two slits 83, two sets of lamps 84 and two lenses 85 are employed in conjunction with a single photosensitive tape. Consequently, the same reference numerals as were employed for the elements of the recording apparatus 60 are employed for the corresponding elements of the recording apparatus 160, the duplicate elements incorporated in the recording apparatus 160 being identified by adding the suffix "$a$."

Considering the operation of the recording apparatus 160, one variable to be recorded on the photosensitive tape 75 is applied to the generator 61 and the other variable is applied to the generator 61$a$, the generators 61 and 61$a$ being independently rotatable. Thus, two sets or channels of cyclical functions are recorded on the photosensitive tape 75 side by side, one set corresponding to one of the variables and the other set corresponding to the other variable. In all other respects, the operation of the recording apparatus 160 is identical to that of the recording apparatus 60.

Figure 11:
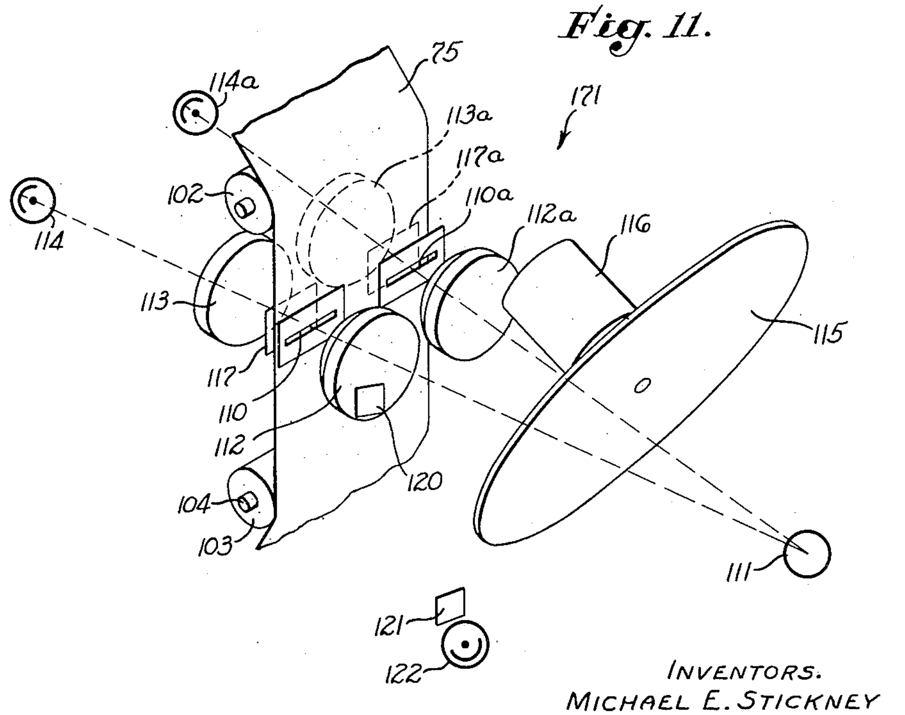
Fig. 11 is a perspective view illustrating diagrammatically one embodiment of a detecting means for detecting two recorded variables, the embodiment of the detecting means illustrated in Fig. 11 being similar to that illustrated in Figs. 7 and 8.
Figure 12:
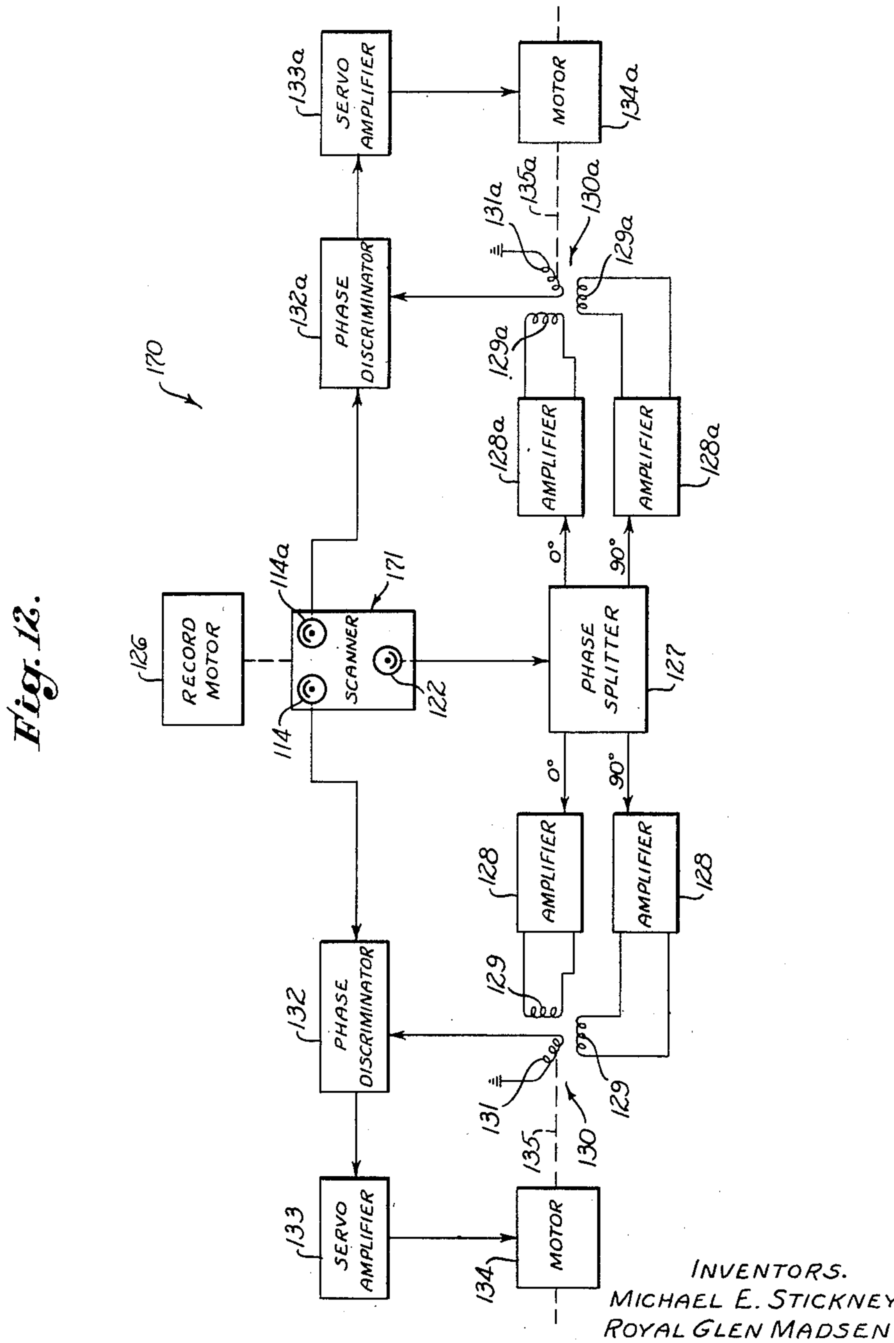
Fig. 12 is a diagrammatic view of one embodiment of a reproducing apparatus for reproducing two variables, the embodiment of Fig. 12 incorporating the detecting means of Fig. 11, illustrated in block form, and being similar to the embodiment illustrated in Fig. 9.

In Figs. 11 and 12 of the drawings is illustrated a reproducing apparatus 170 for reproducing the two variables recorded by the recording apparatus 160, i. e., for generating two quantities respectively representative of the variables recorded by the recording apparatus 160. The reproducing apparatus 170 includes a scanning means 171 which is similar to the scanning means 101, except that it includes two slits 110, lenses 112, lenses 113, photocells 114 and two sets of stationary polarizers 117. The same reference numerals as employed for the elements of the scanning means 101 are employed for corresponding elements of the scanning means 170 and the duplicated elements of the scanning means 171 are also identified by corresponding reference numerals having the suffix *"a"* added thereto. The lamp 111 provides a beam of light which passes through the rotatable polarizer 115 and which is then split into two beams, these two beams respectively passing through the lenses 112 and 112*a*, the slits 110 and 110*a*, the two sets of vector magnitude functions on the tape 75, the two sets of stationary polarizers 117 and 117*a*, the two lenses 113 and 113*a*, and impinge on the two photocells 114 and 114*a*. A single reference photocell 122 is employed, the mirror 120 again intercepting part of the rotating polarized light transmitted by the rotatable polarizer 114 and directing it through the stationary polarizer 121 to the reference photocell.

Considering the operation of the scanning means 171, it will be apparent that the photocells 114 and 114*a* respectively produce cyclical information signals the phases of which vary in proportion to the corresponding variations in the two variables originally recorded by the recording apparatus 160.

In Fig. 12 of the drawings, the scanning means 171 is shown connected in an electrical circuit one side of which is identical to the circuit of Fig. 9 and is connected to the photocell 114, and the other side of which is a mirror image and is connected to the photocell 114*a*. The elements of the side of Fig. 12 which is the same as Fig. 9 are identified by the same reference numerals and the elements on the opposite side of Fig. 12 are identified by the same reference numerals with the suffix *"a"* added. It will be noted that a common phase splitter 127 is employed for both sides of the circuit of Fig. 12.

Thus, with the circuit of Fig. 12, the motor 134 duplicates the movement of the rotary function represented by the generator 61 of the recording apparatus 160 and the motor 134*a* duplicates the rotary function represented by the generator 61*a* of the recording apparatus 160. Thus, it will be seen that the recording apparatus 160 and the reproducing apparatus 170 are respectively capable of recording two variables and of generating two quantities respectively representative of the original variable.

In Fig. 13 of the drawings is illustrated diagrammatically a spectrophotometer which will be described only in general herein, being described in detail and various features thereof being claimed in applications Serial Nos. 722,038 and 722,039, both filed January 14, 1947, Patent Nos. 2,607,899 of August, 19, 1952, and 2,562,525 of July 31, 1951, respectively, and assigned to the same assignee as the present application.

This spectrophotometer is provided with four compartments 260, 261, 262 and 263 interconnected in light-tight relation except for communicating apertures intended to pass selected energy or radiation. The first compartment 260 includes an energy source, such as a Nernst glower 264, the radiation beam from which is interrupted at a low freqency, for example, ten times per second, by a rotating shutter 265. The beam is transferred by various optical elements, including a condensing mirror 266, through a liquid-cell region 267 and a gas-cell region 268 within the compartments 261 and 262, respectively. Cells in these regions are used to enclose the substances undergoing examination, the region depending upon the physical form of the substance as indicated by the cell name. A phototube 269 is provided to receive a portion of the radiation through an adjustable shutter 269*a* to monitor the source 264 to maintain constant the output thereof. The radiation is focused to form an image of the source 264 upon an upper, entrance slit defined by a slit-forming means 270, and is collimated by a spherical mirror 271 and directed to a prism 272 which disperses the radiation and directs it toward a rotatable mirror 273. Rotation of this mirror results in varying the wavelength of the radiation directed toward an exit slit which is disposed beneath the entrance slit, as will be discussed in more detail hereinafter. Thus, the mirror 273 may be regarded as a wavelength-varying means of the dispersing system formed by this mirror and the prism 272. Rotation of the mirror 273 is produced by a shaft extending from the compartment 263, which shaft is adapted to be driven by a wavelength motor 274. This shaft and motor may be regarded as forming part of a wavelength drive means 275 for operating the wavelength-varying means.

After the radiation beam, dispersed by the prism 272, impinges on the rotatable mirror or wavelength-varying means 223, it is reflected and is dispersed a second time by the prism 272. The re-dispersed radiation beam is focused by the collimating mirror 271 upon the plane of the exit slit, which, as hereinbefore indicated, is disposed beneath the entrance slit and is defined by the slit-forming or slit-defining means 270. The beam is then directed by a plane mirror 276 toward a condensing mirror 277 which focuses an image of the exit slit upon a detector 278, which serves as an output-signal generating means and which may be a thermocouple, for example. The slit-defining means 270 is provided with a slit drive means 279 for varying the width of the slit formed thereby, the slit drive means 279 being exemplified as including a shaft which extends from the compartment 263 and which is connected to a slit motor 280.

Thus, in the spectrophotometer illustrated in Fig. 13, the wavelength of the radiation directed toward the exit slit by the wavelength-varying means is controlled by the wavelength motor 274, and the widths of the entrance and exit slits are controlled by the slit motor 280.

The positions of the wavelength-varying means and the slit-defining means, as controlled by the wavelength and slit motors 274 and 280 through the rotatable shafts of the wavelength and slit drive means 275 and 279, are variables the functional relation between which it is desired to record and reproduce with the recording and reproducing apparatus of the present invention. That is to say, we desire to record variations in the position of the slit-varying means as a function of variations in the position of the wavelength-varying means. As discussed in detail in the aforesaid co-pending application Serial No. 168,308, because of the varying intensity of the output of the heterochromatic radiation source 264 as a function of wavelength, and other factors, the output signal generated by the detector or output-signal generating means 278 varies with wavelength even when no sample material is present in either the liquid-cell region 267 or the gas-cell region 268. It is desirable to maintain the output-signal generating means 278 constant during a recording run to provide a constant reference level and this may be accomplished by continually varying the widths of the entrance and exit slits similarly as the wavelength of the radiation directed toward the exit slit is varied by the wavelength-varying means. Thus, during a scan of wavelength resulting from rotation of the wavelength-varying means or mirror 273 by the wavelength-drive means 275, the widths of the entrance and exit slits may be continually adjusted through the slit-drive means 279 so as to maintain the output signal of the detector 278 constant during the recording operation to provide a constant reference level. A circuit for so varying the slit widths is described in detail in the aforesaid co-pending application Serial No. 168,308 and will not be described in detail herein.

Figure 14:
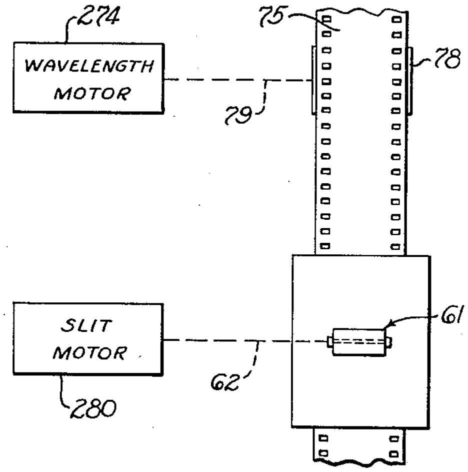
Fig. 14 is a view similar to Fig. 4, but illustrating the application of the embodiment of Figs. 3 to 5 to the spectrophotometer of Fig. 13, Fig. 14 illustrating the embodiment of Figs. 3 to 5 as utilized to record the relation between two variables.

The recording apparatus 60 illustrated in Figs. 3 to 5 of the drawings is applicable to recording the positions of the wavelength and slit drive means 275 and 279 during such an operation wherein the slit widths are continually adjusted to maintain the output signal constant. As indicated diagrammatically in Fig. 14, the recording apparatus 60 may be applied to the spectrophotometer to record the position of the slit-drive means as a function of position of wavelength-drive means merely by connecting the wavelength motor 274 to the shaft 79 for driving the photosensitive tape 75, and by connecting the slit motor 280 to the shaft 62 of the generator 61. Alternatively, the wavelength-drive means 275 and the slit-drive means 279 may be operatively connected to the shafts 79 and 62, respectively, by gearing, not shown, or otherwise.

Thus, with the wavelength motor 274 driving the tape 75 and the slit motor 280 driving the generator 61, the phase of the recorded rotating function, as defined by the magnitude functions 90 of the three resolved components, recorded on the tape varies as the widths of the entrance and exit slits, and is recorded as a function of longitudinal tape position. Consequently, where the relationship between any two variables, such as wavelength and slit width, is to be recorded, it may be recorded readily with the recording apparatus 60 of the invention by varying the position of the tape in proportion to variations in the magnitude of one of the variables and by simultaneously varying the position of the generator 61 in proportion to variations in the magnitude of the other variable, which is an important feature of the invention. The variable responsible for the position of the tape may be regarded as an independent variable, and the variable responsible for the position of the generator 61 may be regarded as the dependent variable.

Figure 15:
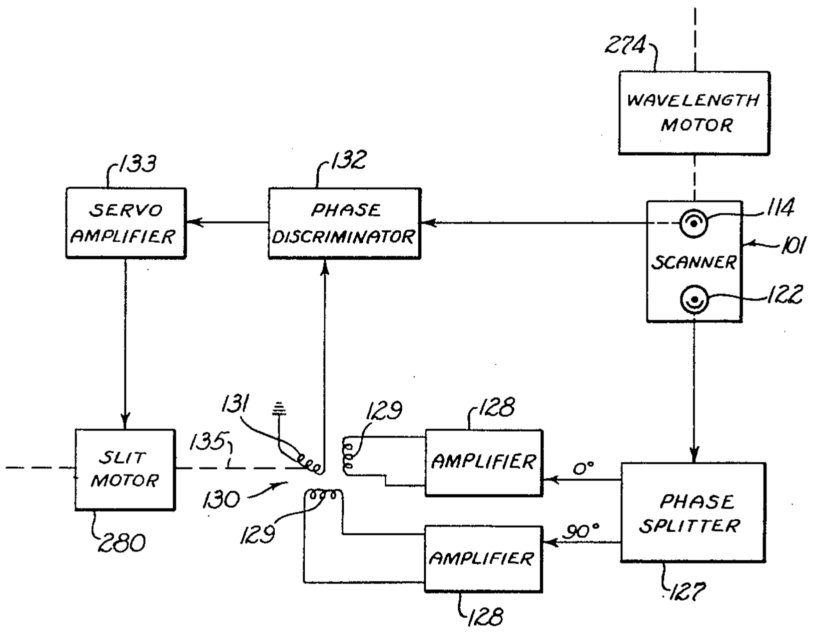
Fig. 15 is a view similar to Fig. 9, but illustrating the application of the embodiment of Fig. 9 to the spectrophotometer of Fig. 13, Fig. 15 illustrating the utilization of the embodiment of Fig. 9 for reproducing the relation between two variables recorded in accordance with the embodiment of Fig. 14.

Whenever it is desired to reproduce the recorded relationship between wavelength and slit width, this may be done readily with a circuit similar to that illustrated in Fig. 9, by employing the wavelength motor 274, or the wavelength drive means 275, to drive the tape through the scanner 101 and by employing the cyclical information signal generated by the photocell 114 to control the slit motor 280, as illustrated in Fig. 15 of the drawings. In the reproducing apparatus illustrated in Fig. 15, it will be apparent that the position of the wavelength motor is the independent variable and the position of the slit motor is the dependent variable. Thus, with this arrangement, the relative positions of the wavelength and slit drive means 275 and 279 recorded during the recording operation with the recording apparatus of Fig. 14 may be precisely duplicated. In other words, as the wavelength is again scanned in the reproducing process, the slit width pattern as a function of wavelength is duplicated in precisely the same relationship as obtained originally. As the original relationship between the wavelength and slit width is precisely duplicated in this manner, a sample may be present in one of the regions 267 or 268 so that the output signal at the detector 278 is directly proportional to the transmittancy of the sample material because of the fact that the output signal was maintained constant during the recording operation with no sample material present. As fully disclosed in the aforesaid co-pending application Serial No. 168,308, the output signal may be suitably amplified and recorded. Accordingly, there is produced a record of transmittancy as related to wavelength which is independent of extraneous variations in radiation intensity with wavelength as the spectrum is traversed, such as the variations relative to wavelength which arise from the radiation source 264, for example.

Thus far in the description of the present invention, it has been assumed that the variables to be recorded and reproduced have physical manifestations or characteristics which may be applied to the tape and the cyclical-function generator either directly, in the event that such physical manifestations or characteristics are rotary functions, or indirectly by coverting such physical manifestations or characteristics into rotary functions. However, in some instances, the variables to be recorded have no physical manifestations or characteristics which may be used in this manner, and, in such instances, the precise functional relationship desired between two such variables must be recorded somewhat differently. For example, assume that we have a known function of two variables which has, for example, been derived empirically, the functional relationship then being available in tabular or graph form. In other words, the functional relationship to be recorded may be available in the form of a graph one co-ordinate of which represents the magnitude of one of the variables and the other co-ordinate of which represents the corresponding magnitude of the other variable. Such a graph may either be a straight line function, or any other function.

Figure 16:
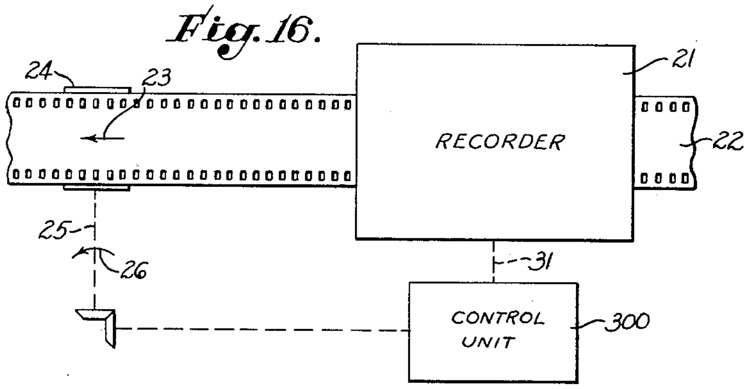
Fig. 16 is a simplified diagrammatic view illustrating an apparatus for recording a known functional relation between two variables.

Referring now to Fig. 16 of the drawings, illustrated therein is a recording apparatus which is illustrated diagrammatically in simplified form and which is identical in part to the recording apparatus 20 of Fig. 1, identical reference numerals being employed for corresponding components. However, instead of being driven independently, the shaft 25 for the tape 22 and the shaft 31 for introducing a variable into the recorder 21 are driven by a control unit or control means 300 having stored therein the data corresponding to the desired functional relationship between two variables which is to be recorded. The control means 300 is adapted to drive the shaft 25 in proportion to one co-ordinate of the functional relationship to be recorded and is adapted to drive the shaft 31 in proportion to the other co-ordinate of such functional relationship. Thus, the resulting record on the tape is a record of the functional relationship between the two variables, such a record being similar to that produced by the apparatus of Fig. 14. The control means 300 may take various forms and is therefore illustrated only diagrammatically. For example, the control means may be a cam incorporating the functional relationship between the two variables, or it may include a nonlinear potentiometer incorporating such functional relationship, or the like. Also, it will be noted that the apparatus disclosed in the aforesaid co-pending application Serial No. 168,308 for maintaining the intensity of the output signal of the spectrophotometer constant during recording controls the action of the slit motor as a function of wavelength so that it forms a control means similar to the control means 300.

Referring now to Fig. 17 of the drawings for a consideration of one possible application of a record produced by the recording apparatus of Fig. 16, it is convenient to use in connection with a spectrophotometer a chart-type recorder 305 for recording the intensity of the radiation incident on the detector or output-signal generating means 278 of the spectrophotometer. This chart-type recorder 305 includes a movable chart or chart means 306 which is adapted to be driven by a chart drive means indicated generally by the numeral 307, the advancement of the chart 306 being controlled by the wavelength drive means so that the longitudinal chart position is a function of the wavelength of the radiation incident on the detector, as will be discussed in more detail hereinafter. The intensity of the radiation incident on the detector is recorded transversely of the chart 306 by means of a pen 308, or the like, which is movable transversely of the chart. The position of the pen 308 transversely of the chart 306 is determined by the strength of the output signal generated by the detector 278, the detector controlling the pen through a signal amplifier and synchronous rectifier 309 and a filter and amplifier 310.

If the relationship between the radiation wavelength directed toward the exit slit by the wavelength-varying means 273 and the position of the wavelength-varying means were linear, it will be apparent that the chart 306 could be driven directly from the wavelength drive means 275 to render the longitudinal scale on the chart 306 linear with respect to wavelength. However, the wavelength-position relationship of the wavelength-varying means 273 is not a linear function. Consequently, a non-linear element must be introduced between the wavelength drive means and the chart-type recorder 305. The non-linear wavelength-position function of the wavelength-varying means 273 may be determined empirically for any particular dispersing system and dispersing system drive. Once the wavelength-position function of the wavelength-varying means has been established, a record thereof may be produced on a tape, such as the tape 22 of Fig. 16, by means of the apparatus of Fig. 16, the resulting record on the tape being a record of the nonlinear wavelength-position function. Preferably, the data corresponding to the nonlinear wavelength-position function are introduced into the control means 300 in such a manner that the resulting cyclical functions on the tape have a phase-length relationship which is the same nonlinear function as the wavelength-position relationship.

Now, referring to Fig. 17 of the drawings, it will be assumed that the tape 22 having recorded thereon in cyclical form functions representing a phase-length relationship which is the same nonlinear function as the wavelength-position relationship of the wavelength-varying means, is driven through the scanning means 101 by the wavelength motor 274. As in the reproducing apparatus 100 of Fig. 9, the photocell 114 is connected to the phase discriminator 132 and the photocell 122 provides a reference signal utilized as previously described. Any error signal generated by the phase discriminator 132 is applied through the servo-amplifier 133 to a chart motor 311 which controls the chart 306 through a synchro system comprising synchros 312 and 313, the synchro 312 being driven by the chart motor and the synchro 313 driving the chart 306. In a manner similar to that described previously, the chart motor 311 is connected to the rotor of the synchro 130.

Thus, with the circuit illustrated in Fig. 17 of the drawings, the wavelength motor 274 drives the chart 306 through the medium of the record of the nonlinear wavelength-position function of the wavelength-varying means so that the movement of the chart 306 is linear with respect to wavelength. Thus, a linear wavelength scale extending longitudinally of the chart 306 is provided, which is an important feature of the invention.

It will be seen that, in effect, the record of the nonlinear wavelength-position function is a cam which causes the chart motor 311 to operate nonlinearly with respect to the wavelength motor 274 so as to eliminate in the chart 306 the nonlinearity of the wavelength-position relationship of the wavelength-varying means 273.

Heretofore, various embodiments of the recording and reproducing apparatus of the invention and various specific applications thereof have been considered in connection with the use of photosensitive tapes, although the possibility that tapes having other characteristics might be employed has been indicated. In Fig. 18 of the drawings is illustrated a recording and reproducing apparatus of the invention which utilizes a magnetic tape, i. e., a magnetizable tape, and this embodiment of the invention will now be considered in detail.

Referring to Fig. 18 of the drawings, the recording and reproducing apparatus illustrated therein is adapted to record variations in the selected variable on a magnetic or magnetizable tape 321 which may be driven in any suitable manner, as by a roller 322 which is driven by a motor 323 through a shaft 324. As in the recording embodiments described previously, the tape 321 is driven unidirectionally during recording, as in the direction of the arrow 325.

The recording and reproducing apparatus of Fig. 18 includes a shaft 330 which is provided with two cranks 331 arranged in out-of-phase relation. The two cranks 331 are illustrated as being 90° out of phase, although it will be understood that other useful out-of-phase relations may be employed. Also, three or more cranks may be employed if desired. The shaft 330 is rotatable in either direction, as indicated by the bidirectional arrow 332.

As will be apparent, the shaft 330 with the cranks 331 thereon is a mechanism for resolving a rotating function into component vectors of variable magnitude and may be designated generally by the numeral 333 for convenience, being comparable to the vector function generator 61 hereinbefore described. Thus, as the generator 333 rotates, it translates a rotary function into two out-of-phase components by the cranks 331. If the variable to be recorded is in itself a rotary function, such as the position of a rotatable element, it may be applied directly to the shaft 330 to rotate the vector function generator 333. Alternatively, the variable to be recorded may be converted into a rotary function, as hereinbefore discussed, for application to the generator 333.

Considering the manner in which the sine functions generated by the cranks 331 are impressed or recorded on the tape 321, two magnetic recording heads 335 are respectively mounted on rods 336 which are respectively connected to the cranks 331 through slotted plates 337 acting as Scotch yokes. Thus, as the generator 333 rotates, the recording heads 335 are reciprocated transversely of the moving tape 321, as indicated by the bidirectional arrows 338. Thus, the recording heads 335 impress on the tape 321 cyclically functions 339 which represent component vector magnitudes, the vector sum of which is a rotary function the phase of which, with respect to a reference point on the tape, is proportional to the phase angle of the rotary function represented by the generator 333. Thus, the phase of the rotary function defined by the component vector magnitude functions 349 is proportional to any variations in the magnitude of the variable being recorded. As will be apparent, changes in the rate and/or direction of variation of the variable will produce vector magnitude functions 339 similar to those illustrated in Fig. 6 of the drawings, except that in the present instance we are recording two component vector magnitudes 90° apart, while in the previous instance three component vector magnitudes 120° apart were recorded.

During reproduction or playback, servomotors 345 are operatively connected to the rods 336, as by mounting on the servomotor shafts gears 346 which may be swung into mesh with racks 347 on the rods. During reproduction, the recording heads 335 may act as, or be replaced by, detectors, which may be pickup units of the magnetometer type, such devices being known in the art. Two identical servomechanisms, each comprising one of the detectors 335, a combined detector amplifier, discriminator and power amplifier 348, and the corresponding servomotor 345, cause the detectors to follow accurately the vector magnitude functions 339. Consequently, upon movement of the tape 321, the shaft 330 is caused to reiterate the motion thereof which resulted in the generation of the vector magnitude functions. As will be apparent, the tape may be moved in either direction during reproduction so as to reproduce variations in the position of the shaft 330 either in their original sequence, or in reverse sequence. Also, the tape may be moved over a wide range of speeds differing from the speed of movement in recording if desired, this being an important advantage of the invention.

As hereinbefore indicated, any of the recording and reproducing apparatuses may be rendered absolute positioning merely by adding to the tape during recording a channel of cyclical functions the phase of the vector sum of which does not exceed one cycle during the entire recording operation. As will be apparent, this may be accomplished by gearing to one of the vector magnitude function generators 61 or 333 another similar, vector magnitude function generator, not shown, in such a manner that the second vector magnitude function generator does not rotate through more than one revolution for the total number of revolutions required of the first sine wave generator during particular recording run.

Also, a monitoring channel may be recorded on the tape to control the sequence of reproduction of several variables, an application of this concept being disclosed in detail in the aforesaid co-pending application Serial No. 168,308.

While we have disclosed various exemplary embodiments and applications of the present invention, it will be understood that the invention is susceptible of various other embodiments and applications without departing from the spirit thereof.

We claim as our invention:

1. An apparatus for reproducing a variable from a movable tape having opaque and transparent areas which are arranged in side-by-side relation transversely of the tape and which define at least three cyclical functions arranged in side-by-side relation transversely of the tape, said cyclical functions being out of phase with respect to each other and the phases thereof varying with respect to a reference in proportion to any variation in the variable, said apparatus including: means for moving the tape along a path which extends longitudinally thereof; a radiation source on one side of the path of the tape; a radiation-sensitive device on the opposite side of the path of the tape; means for directing radiation from said radiation source toward said radiation-sensitive device in the form of a beam which intersects the path of the tape, whereby radiation transmitted by the transparent areas of the tape impinges on said radiation-sensitive device; a rotatable polarizer in said beam; means for rotating said rotatable polarizer; at least three stationary polarizers having different polarization angles disposed in said beam, said stationary polarizers being disposed opposite the cyclical functions on the tape, respectively; another radiation-sensitive device positioned to receive a portion of the radiation transmitted by said rotatable polarizer; another stationary polarizer in the beam of radiation received by said other radiation-sensitive device; and means connected to said radiation-sensitive devices for varying a quantity representative of the variable in proportion to any variation in the phases of the cyclical functions on the tape.

2. An apparatus for reproducing a variable from a movable tape having opaque and transparent areas which are arranged in side-by-side relation transversely of the tape and which define at least three cyclical functions arranged in side-by-side relation transversely of the tape, said cyclical functions being out of phase with respect to each other and the phases thereof varying with respect to a reference in proportion to any variation in the variable, said apparatus including: means for moving the tape along a path which extends longitudinally thereof; a radiation source on one side of the path of the tape; means for directing a beam of radiation from said radiation source toward the path of the tape, whereby those portions of the radiation beam which impinge on the transparent areas of the tape are transmitted by the tape; a rotatable polarizer in said radiation beam; means for rotating said rotatable polarizer; at least three stationary polarizers having different polarization angles disposed in said radiation beam, said stationary polarizers being disposed opposite the cyclical functions on the tape, respectively; a radiation-sensitive device positioned in said radiation beam, said polarizers being disposed between said radiation-sensitive device and said radiation source, whereby the radiation transmitted by the tape is modulated to produce at least three cyclical variations which are out of phase with respect to each other and the magnitudes of which vary in accordance with variations in the phases of the cyclical functions recorded on the tape, the vector sum of said cyclical variations being a vector whose phase angle varies in proportion to any variation in the variable, said cyclical variations being combined by the radiation-sensitive device to produce a cyclical signal having a phase angle which varies in proportion to any variation in the variable; and means connected to said radiation-sensitive device and controlled by said cyclical signal for varying a quantity representative of the variable in proportion to any variation in the variable.

3. An apparatus for reproducing a variable from a movable tape having opaque and transparent areas which are arranged in side-by-side relation transversely of the tape and which define at least three cyclical functions arranged in side-by-side relation transversely of the tape, said cyclical functions being out of phase with respect to each other and the phases thereof varying with respect to a reference in proportion to any variation in the variable, said apparatus including: means for moving the tape along a path which extends longitudinally thereof; a radiation source on one side of the path of the tape; a radiation-sensitive device on the opposite side of the path of the tape; means for directing radiation from said radiation source toward said radiation-sensitive device in the form of a beam which intersects the path of the tape, whereby radiation transmitted by the transparent areas of the tape impinges on said radiation-sensitive device; a rotatable polarizer in said beam; means for rotating said rotatable polarizer; at least three stationary polarizers having different polarization angles disposed in said beam, said stationary polarizers being disposed opposite the cyclical functions on the tape, respectively; a radiation-sensitive element; means disposed in said beam for directing a portion of the radiation transmitted by said rotatable polarizer toward said radiation-sensitive element; a stationary polarizer interposed between the means last defined and said radiation-sensitive element; a synchro having a rotor winding and having at least two field windings; phase splitting means connected to said radiation-sensitive element and to said field windings; phase discriminating means connected to said radiation-sensitive device and to said rotor winding; and a motor connected to the output side of said phase discriminating means and operatively connected to said rotor winding to rotate same.

4. In an apparatus for scanning a movable tape having apaque and transparent areas which are arranged in side-by-side relation transversely of the tape and which define at least three cyclical functions arranged in side-by-side relation transversely of the tape, said cyclical functions being out of phase with respect to each other, the combination of: means for moving the tape along a path which extends longitudinally thereof; a radiation source on one side of the path of the tape; a radiation-sensitive device on the opposite side of the path of the tape; means for directing radiation from said radiation source to said radiation-sensitive device in the form of a beam which intersects the path of the tape, whereby radiation transmitted by the transparent areas of the tape impinges on said radiation-sensitive device; a rotatable polarizer in said beam; means for rotating said rotatable polarizer; at least three stationary polarizers having different polarization angles disposed in said beam between said rotatable polarizer and said radiation-sensitive device, said stationary polarizers being disposed opposite the cyclical functions on the tape, respectively; a radiation-sensitive element; means interposed between said rotatable polarizer and said stationary polarizers for directing radiation transmitted by said rotatable polarizer toward said radiation-sensitive element; and a stationary polarizer disposed between the means last defined and said radiation-sensitive element.

5. In combination: a monochromator having movable wavelength-varying means and wavelength drive means operatively connected to said wavelength-varying means to drive same, said wavelength-varying means having a wavelength-position relationship which is a nonlinear function; movable chart means; chart drive means operatively connected to said chart means to drive same; a cyclical record having a phase-length relationship which is the same nonlinear function as said wavelength-position relationship, said cyclical record being operatively connected to said wavelength drive means to be driven thereby; detecting means operable on said cyclical record for detecting any variations in the phase of said cyclical record occurring lengthwise thereof; and means operatively connecting said chart drive means to said detecting means and responsive to any phase variations detected by said detecting means for operating said chart drive means in accordance with any phase variations detected by said detecting means so as to drive said chart means linearly with respect to wavelength.

6. In combination: a monochromator having movable wavelength-varying means and wavelength drive means operatively connected to said wavelength-varying means to drive same, said wavelength-varying means having a wavelength-position relationship which is a nonlinear function; movable chart means; chart drive means operatively connected to said chart means to drive same; a cyclical record having a phase-length relationship which is the same nonlinear function as said wavelength-position relationship; detecting means for generating a cyclical signal the phase of which varies in proportion to any variation in the phase of said cyclical record occurring lengthwise thereof; and means controlled by said cyclical signal for operating said chart drive means to drive said chart means linearly with respect to wavelength.

7. In combination: a monochromator having movable wavelength-varying means and wavelength drive means operatively connected to said wavelength-varying means to drive same, said wavelength-varying means having a wavelength-position relationship which is a nonlinear function; movable chart means; chart drive means operatively connected to said chart means to drive same; a cyclical record having a phase-length relationship which is the same nonlinear function as said wavelength-position relationship; detecting means for generating a cyclical signal the phase of which varies in proportion to any variation in the phase of said cyclical record occurring lengthwise thereof; means for generating a cyclical reference signal; a synchro having at least two field windings and a rotor winding; means for splitting said cyclical reference signal into at least two out-of-phase components and for applying same to said field windings, respectively; phase discriminating means; means for connecting said detecting means to said phase discriminating means so as to apply said cyclical signal generated by said detecting means to said phase discriminatng means; means for connecting said rotor winding to said phase discriminating means; means for connecting the output side of said phase discriminating means to said chart drive means; and means providing a driving connection between sad chart drive means and the rotor of said synchro.

8. In a spectrophotometer, the combination of: a monochromator having movable wavelength-varying means and wavelength drive means operatively connected to said wavelength-varying means to drive same, the distribution of wavelength versus position for said wavelength-varying means being a nonlinear function; movable chart means; chart drive means operatively connected to said chart means to drive same; a movable tape having opaque and transparent areas which define at least three cyclical functions arranged in side-by-side relation transversely of the tape, said cyclical functions being out of phase with respect to each other and the phases thereof lengthwise of said tape being nonlinear functions identical to said nonlinear wavelength-versus-position function; means operatively connected to and driven by said wavelength drive means for driving said tape; a light source on one side of the path of the tape; a first photocell on the opposite side of the path of the tape; means for directing a beam of light from said light source across the path of the tape and toward said first photocell, whereby light transmitted by the transparent areas of the tape impinges on said first photocell; a polarizing system including a rotatable polarizer in said light beam, including means for rotating said rotatable polarizer, and including at least three stationary polarizers having different polarization angles disposed in said light beam between said rotatable polarizer and said first photocell, said stationary polarizers being disposed opposite the cyclical functions on the tape, respectively, whereby said first photocell generates a cyclical signal having a phase angle determined by the position of the tape relative to said light beam; a second photocell; means for directing a portion of the light transmitted by said rotatable polarizer toward said second photocell; a stationary polarizer disposed intermediate the means last defined and said second photocell, whereby said second photocell generates a cyclical reference signal; and means controlled by said cyclical signal generated by said first photocell and said cyclical reference signal generated by said second photocell for operating said chart drive means to drive said chart means linearly with respect to wavelength.

9. A spectrophotometer as defined in claim 8 wherein the means last defined includes: a synchro having a rotor winding and at least two field windings; phase-splitting means connected to said second photocell and to said field windings for splitting said cyclical reference signal provided by said second photocell into two out-of-phase components and for applying said components to said field windings, respectively; a phase discriminator connected to said first photocell and to said rotor winding; means connecting said chart drive means to the output side of said phase discriminator; and means providing a driving connection between said chart drive means and the rotor of said synchro.

10. In an apparatus for recording a variable, the combination of: a rotatable member; means for varying the angular position of said member relative to a reference position through an angle proportional to any variation of the variable; means operable by said member for generating a sensible quantity varying continuously in magnitude as a sine function of said angle; means operable by said member for generating at least one additional sensible quantity varying as said sine function of said angle plus an additional constant angle; a record member; and means responsive to said sensible quantities and arranged to simultaneously record said varying quantities upon said record member.

11. In an apparatus for recording a variable, the combination of: a rotatable member; means for varying the angular position of said member relative to a reference in proportion to any variation of the variable; means operable by said member for generating a sensible quantity varying in amplitude as sin $a$ where $a$ is said angular position; means operable by said member for generating at least one other sensible quantity varying in amplitude as sin $(a+mc)$, where $c$ is a constant angle, and where $m$ is a different whole number for each of said other varying quantities; a record; and means responsive to said sensible quantities and arranged to simultaneously record said varying quantities on said record.

12. In an apparatus for recording a variable, the combination of: a rotatable member; means for varying the angular position of said member relative to a reference in proportion to any variation of the variable; means operable by said member for generating a sensible quantity varying in amplitude as $A[(\sin a)+1]$ where A is a constant and where $a$ is said angular position;

means operable by said member for generating at least one other sensible quantity varying in amplitude as $A[\sin(a+2\pi n/m)+1]$ where $m$ is a fixed whole number, and where $n$ is a whole number differing for each of said other varying quantities and varying consecutively from (1) to $(m-1)$; a record; and means responsive to said sensible quantities and arranged to simultaneously record said varying quantities on said record.

13. In an apparatus for recording a variable, the combination of: a rotatable member; means for varying the angular position of said member relative to a reference in proportion to any variation of the variable; means operable by said member for generating a sensible quantity varying in amplitude as $A[(\sin a)+1]$ where A is a constant and where $a$ is said angular position; means operable by said member for generating a second sensible quantity varying in amplitude as $A[\sin(a+2\pi/3)+1]$; means operable by said member for generating a third sensible quantity varying in amplitude as $$A[\sin(a+4\pi/3)+1]$$

a record; and means responsive to said sensible quantities and arranged to simultaneously record said varying quantities on said record.

14. In an apparatus for reproducing from a record variations in the angle of rotation of a rotatable member, said record defining at least two variable magnitude functions one of which varies as a sine function of said angle and each of the others of which varies as said sine function of said angle plus an additional, constant angle, the combination of: means for generating an alternating reference signal of a predetermined frequency; means for generating a first modulable alternating signal of said predetermined frequency fixed in phase with respect to said reference signal; means for generating at least one additional modulable alternating signal of said predetermined frequency, said additional modulable signals being fixed in phase with respect to said first modulable signal but differing in phase from said first modulable signal and from each other; means operable on said record for modulating said first modulable signal in proportion to one of said variable magnitude functions; means operable on said record for modulating said additional modulable signals in proportion to said other variable magnitude functions, respectively; means for adding said modulated signals to produce a resultant signal of varying phase angle corresponding to variations in said angle of rotation of said member; and means for translating said varying phase angle into corresponding variations in the angle of rotation of a rotatable output member.

References Cited in the file of this patent

UNITED STATES PATENTS

| | | |
|---|---|---|
| 1,221,895 | Odell | Apr. 10, 1917 |
| 1,320,097 | Sattler | Oct. 28, 1919 |
| 1,438,403 | Scherler | Dec. 12, 1922 |
| 1,516,808 | Duncan | Nov. 25, 1924 |
| 1,685,667 | Davis | Sept. 25, 1928 |
| 1,894,132 | Stone | Jan. 10, 1933 |
| 2,213,108 | Pollard | Aug. 27, 1940 |
| 2,247,214 | Wagar | June 24, 1941 |
| 2,261,644 | Cockrell | Nov. 4, 1941 |
| 2,408,023 | Kruper | Sept. 24, 1946 |
| 2,470,592 | Waller et al. | May 17, 1949 |
| 2,475,245 | Leaver et al. | July 5, 1949 |
| 2,489,305 | McLennan | Nov. 29, 1949 |
| 2,499,322 | Mather et al. | Feb. 28, 1950 |
| 2,503,052 | Keinath | Apr. 4, 1950 |
| 2,509,185 | Eckel | May 23, 1950 |
| 2,517,121 | Liston | Aug. 1, 1950 |
| 2,519,925 | Okuniew | Aug. 22, 1950 |
| 2,574,104 | Ireland | Nov. 6, 1951 |
| 2,623,116 | Rymes | Dec. 23, 1952 |
| 2,628,539 | Neergaard | Feb. 17, 1953 |
| 2,641,523 | Beckman et al. | June 9, 1953 |